US012044987B2

(12) United States Patent
Nakajima

(10) Patent No.: US 12,044,987 B2
(45) **Date of Patent: *Jul. 23, 2024**

(54) MONOCHROME IMAGE FORMING APPARATUS

(71) Applicant: CANON KABUSHIKI KAISHA, Tokyo (JP)

(72) Inventor: Takao Nakajima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/071,753

(22) Filed: Nov. 30, 2022

(65) Prior Publication Data

US 2023/0168609 A1 Jun. 1, 2023

Related U.S. Application Data

(63) Continuation of application No. 17/462,584, filed on Aug. 31, 2021, now Pat. No. 11,526,101.

(30) Foreign Application Priority Data

Sep. 9, 2020 (JP) ................................ 2020-150923

(51) Int. Cl.
*G03G 15/16* (2006.01)

(52) U.S. Cl.
CPC ................................ *G03G 15/1615* (2013.01)

(58) Field of Classification Search
CPC ........... G03G 15/1615; G03G 15/0131; G03G 15/0136; G03G 15/0178; G03G 15/0189; G03G 15/1605
See application file for complete search history.

(56) References Cited

U.S. PATENT DOCUMENTS

| | | | | |
|---|---|---|---|---|
| 8,417,164 | B2 | 4/2013 | Ichihashi et al. | |
| 10,317,821 | B2 | 6/2019 | Nakajima | |
| 11,526,101 | B2 * | 12/2022 | Nakajima .......... | G03G 15/1615 |

FOREIGN PATENT DOCUMENTS

| | | |
|---|---|---|
| JP | 2014-232130 A | 12/2014 |

* cited by examiner

*Primary Examiner* — Sandra Brase
(74) *Attorney, Agent, or Firm* — Venable LLP

(57) ABSTRACT

A control portion controls a change mechanism so as to pass through a third stretched form in switching a stretched form of a belt member from a second stretched form to a first stretched form. The first stretched form is a stretched form enabling a toner image to be transferred from a photosensitive drum to the belt member by positioning a transfer member at a first position and a separation roller at a second position. The second stretched form is a stretched form of separating each of the transfer member and the separation roller from a transfer surface toward an opposite side of the photosensitive drum. The third stretched form is a stretched form in which the transfer member is positioned at the first position, and the separation roller is positioned at a third position away from the transfer surface toward the opposite side of the photosensitive drum.

11 Claims, 11 Drawing Sheets

MONOCHROME IMAGE FORMING APPARATUS

BACKGROUND OF THE INVENTION

Field of the Invention

The present invention relates to an image forming apparatus such as a copier, a printer, a facsimile machine and a multi-function printer having a plurality of these functions and more specifically to a monochrome image forming apparatus.

Description of the Related Art

Hitherto, a configuration of an intermediate transfer system of primarily transferring a toner image from an image bearing member such as a photosensitive drum to an intermediate transfer belt, i.e., a belt member, and of secondarily transferring the toner image from the intermediate transfer belt to a recording material is known in an electro-photographic type image forming apparatus. Still further, a configuration of forming a full color image by using a plurality of image forming units and of forming a monochromatic image by removing color image forming units from the plurality of image forming units and by using only a black image forming unit in the configuration having the plurality of image forming units has been proposed in Japanese Patent Application Laid-open No. 2014-232130 for example.

Beside the configuration of mounting and removing the color image forming units in the configuration that enables to form a full color image and a monochrome image like Japanese Patent Application Laid-open No. 2014-232130 described above, there is a configuration of bringing the intermediate transfer belt into contact with the image bearing members or of separating the intermediate transfer belt from the image bearing members while mounting all of the image forming units. While the intermediate transfer belt is stretched by a plurality of stretch rollers, one of the stretch rollers is set as a movable separation roller for bringing the intermediate transfer belt into contact with the image bearing member or for separating the intermediate transfer belt from the image bearing member by moving the separation roller. For instance, in a case of forming a full color image, the separation roller is moved such that the intermediate transfer belt comes into contact with all of the image bearing members (this state will be referred to as a "first stretched cross section" hereinafter). Meanwhile, in a case of forming only a monochrome image, the separation roller is moved such that the intermediate transfer belt comes into contact only with the black image bearing member and is separated from the other image bearing members (this state will be referred to as a "second stretched cross section" hereinafter).

In a case of setting the stretched cross section of the intermediate transfer belt into the second stretched cross section to form the monochrome image by removing the color image forming units like Japanese Patent Application Laid-open No. 2014-232130, a tension of the intermediate transfer belt becomes lower than a case of the first stretched cross section. Therefore, image quality of the image to be transferred onto the recording material is liable to drop due to an impact caused when the recording material enters a secondary transfer portion where the toner image is transferred from the intermediate transfer belt to the recording material.

Then, it is conceivable to form an image by setting the first stretched cross section in a monochrome image forming apparatus. Meanwhile, there is a case of separating primary transfer rollers from the intermediate transfer belt in forming no image (this state will be referred to as a "total separation mode" or a "third stretched cross section" hereinafter). This arrangement makes it possible to suppress the intermediate transfer belt from rubbing with the photosensitive drum in replacing the intermediate transfer belt. It is also possible to suppress the intermediate transfer belt from causing curling by releasing the tension of the intermediate transfer belt. However, the following problem occurs in a case of the arrangement of switching the intermediate transfer belt from the third stretched cross section to the first stretched cross section. That is, a torque of a motor increases in switching from the third stretched cross section to the first stretched cross section along with the formation of the image.

SUMMARY OF THE INVENTION

The present invention provides a monochrome image forming apparatus capable of suppressing image quality of an image to be transferred from decreasing while suppressing an increase of a torque in changing stretched shapes of an intermediate transfer belt along with changes of image forming operations.

According to one aspect of the present invention, a monochrome image forming apparatus includes a single photosensitive drum configured to bear a toner image, a belt member onto which the toner image formed on the photosensitive drum is transferred, a transfer member configured to transfer the toner image from the photosensitive drum to the belt member, a plurality of stretch rollers stretching the belt member, the plurality of stretch rollers including a separation roller provided movably at a position upstream of the transfer member and adjacent to the transfer member in a rotation direction of the belt member, a change mechanism configured to change a stretched shape of the belt member by changing the positions of the transfer member and the separation roller, the change mechanism being configured to switch the stretched form of the belt member to a plurality of stretched forms including first, second and third stretched forms, the first stretched form being a stretched form enabling a toner image to be transferred from the photosensitive drum to the belt member by forming a transfer surface between the transfer member and the separation roller by positioning the transfer member at a first position and the separation roller at a second position, the second stretched form being a stretched form of separating each of the transfer member and the separation roller from the transfer surface toward the opposite side of the photosensitive drum, the third stretched form being a stretched form in which the transfer member is positioned at the first position, and the separation roller is positioned at a third position away from the transfer surface toward the opposite side of the photosensitive drum, and, a control portion configured to control the change mechanism. The control portion is configured to control the change mechanism so as to pass through the third stretched form in switching the stretched form of the belt member from the second stretched form to the first stretched form.

Further features of the present invention will become apparent from the following description of exemplary embodiments with reference to the attached drawings.

DESCRIPTION OF THE EMBODIMENTS

Figure 1:
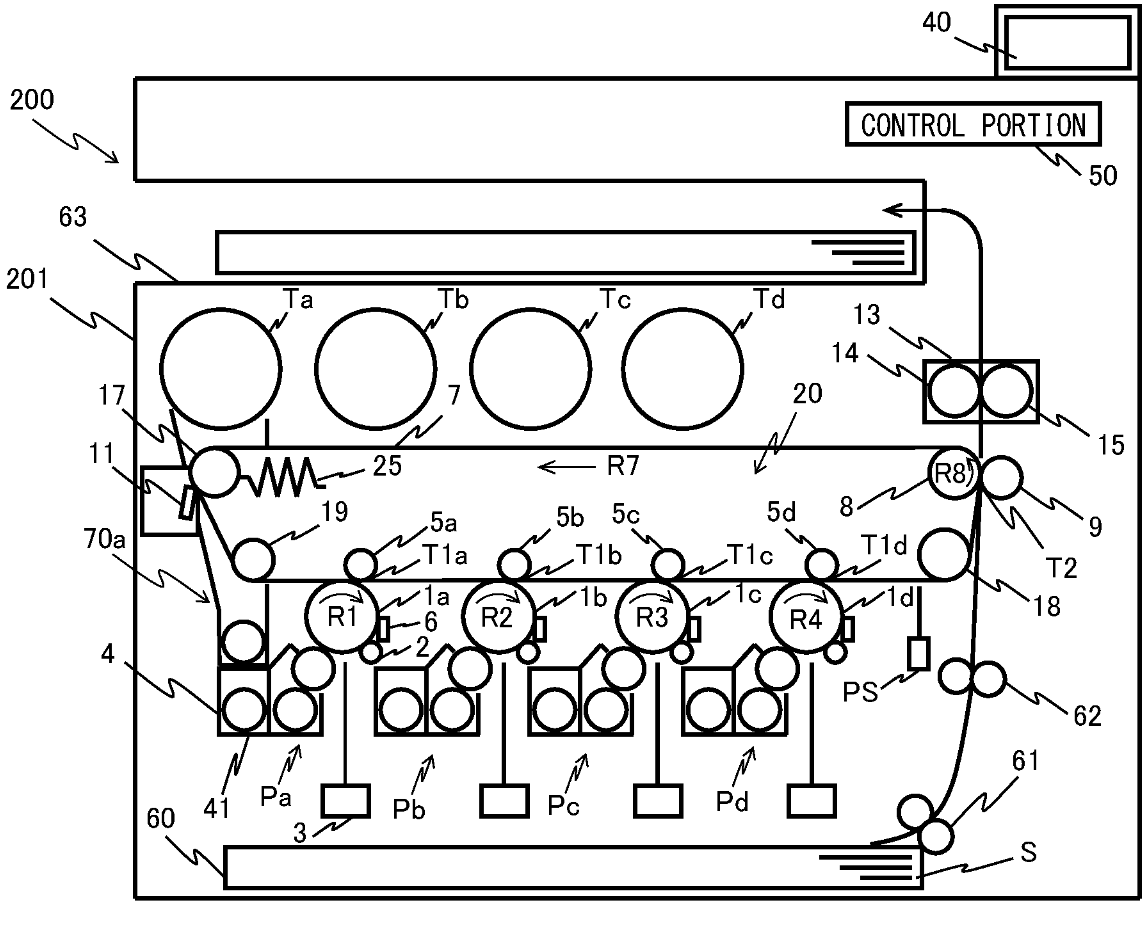
FIG. 1 is a section view schematically illustrating a configuration of a full-color image forming apparatus of a present exemplary embodiment.

Exemplary embodiments will be described with reference to FIGS. 1 through 11B. In the present exemplary embodiment, a full-color image forming apparatus 200 in FIG. 1 configured to form an image by a plurality of color toners is made in common with a basic structure or at least a part of a monochrome image forming apparatus 200K in FIG. 2. Then, an intermediate transfer unit 20 serving as a belt conveyance unit used in the full-color image forming apparatus 200 in FIG. 1 is made in common with a basic structure of an intermediate transfer unit 20K serving as a belt conveyance unit used in the monochrome image forming apparatus 200K in FIG. 2. Firstly, a schematic configuration of the full-color image forming apparatus 200 of the present exemplary embodiment will be described with reference to FIG. 1.

Full-Color Image Forming Apparatus

The full-color image forming apparatus 200 serving as a first image forming apparatus is a so-called intermediate transfer tandem type printer including four image forming units Pa, Pb, Pc and Pd and the intermediate transfer unit 20 within an apparatus body thereof. It is noted that the number of the image forming units, i.e., the number of a plurality of second image bearing members, is not limited to the number described above and may be any plural number of two or more. The apparatus body is composed of a casing 201, i.e., a body frame, configured to support the image forming units Pa, Pb, Pc and Pd and the intermediate transfer unit 20, a decorative cover (not illustrated) and the like.

The full-color image forming apparatus 200 is configured to form and output an image onto a recording material S based on image information read from a document or inputted from an external device. It is noted that the recording material S includes, besides a plain sheet of paper, a special sheet such as a coated sheet, a sheet having a special shape such as an envelope and index sheet and a sheet such as a plastic film for an overhead projector and a cloth.

The image forming units Pa, Pb, Pc and Pd serving as a plurality of second image forming units are configured to form toner images of yellow, magenta, cyan and black and include photosensitive drums 1*a*, 1*b*, 1*c* and 1*d*, respectively, serving as electro-photographic second image bearing members. Because a structure of each of the image forming units is basically the same except that colors of toners used in developing the images are different, the following description will be made by exemplifying a structure of the image forming unit Pa of yellow.

The image forming unit Pa includes a charging unit 2, an exposing unit 3, a developing unit 4 and a drum cleaner 6 disposed around the photosensitive drum 1*a* serving as a drum-shaped photosensitive member. As an image forming operation is started, the photosensitive drum 1*a* is rotationally driven so as to homogeneously charge a surface of the photosensitive drum 1*a* by the charging unit 2, and then to form an electrostatic latent image on the surface of the drum by the exposing unit 3. The electrostatic latent image formed on the photosensitive drum 1*a* is visualized as a toner image by yellow toner supplied from the developing unit 4 storing developer within a developing container 41. That is, the charging unit 2, the exposing unit 3 and the developing unit 4 compose a toner image forming unit for forming the toner image on the photosensitive drum 1*a* serving as a second image bearing member.

It is noted that developer storage containers Ta, Tb, Tc and Td storing developers to be replenished are removably mounted to the casing 201. For instance, the developer storage container Ta stores the developer including the yellow toner which is to be appropriately replenished to the developing container 41 through a replenishing unit 70*a*. As the developer, it is possible to use a two-component developer containing magnetic carrier and non-magnetic toner, one-component developer containing magnetic toner or a liquid developer in which toner particles are dispersed within carrier liquid.

The intermediate transfer unit 20 serving as a second intermediate transfer unit includes an intermediate transfer belt 7 which is an endless second belt member and a plurality of stretch rollers serving as stretch members by which the intermediate transfer belt 7 is stretched. Specifically, the intermediate transfer belt 7 is wound around second stretch rollers, i.e., a secondary transfer inner roller 8, a steering roller 17, a separation roller 19 and an upstream guide roller 18 such that an outer circumferential surface thereof faces the photosensitive drums 1*a* through 1*d* of the image forming units Pa through Pd.

Disposed within an inner circumferential side of the intermediate transfer belt 7 are primary transfer rollers 5*a*, 5*b*, 5*c* and 5*d* serving as a plurality of transfer members as one example of primary transfer units. The primary transfer rollers 5*a* through 5*d* are disposed at positions corresponding respectively to the photosensitive drums 1*a* through 1*d* of the image forming units Pa through Pd to form primary transfer portions T1*a*, T1*b*, T1*c* and T1*d* where the toner images are transferred from the photosensitive drums 1*a* through 1*d* to the intermediate transfer belt 7.

As the secondary transfer inner roller 8 serving as a secondary transfer roller is rotationally driven by a motor (not illustrated) in a predetermined direction indicated by an arrow R8 in FIG. 1, the intermediate transfer belt 7 is rotated in a direction indicated by an arrow R7 following rotations of the photosensitive drums 1*a* through 1*d* indicated by arrows R1, R2, R3 and R4. That is, the secondary transfer inner roller 8 functions also as a driving roller that rotationally drives the intermediate transfer belt 7.

The secondary transfer inner roller 8 is disposed further downstream of the upstream guide roller 18 in terms of a rotation direction of the intermediate transfer belt 7. The secondary transfer inner roller 8 faces a secondary transfer outer roller 9 across the intermediate transfer belt 7 and forms a secondary transfer portion T2 serving as a nip portion between a part of the intermediate transfer belt 7 stretched by the secondary transfer inner roller 8 and the secondary transfer outer roller 9. The secondary transfer inner roller 8 also functions as a roller for transferring the toner image from the intermediate transfer belt 7 onto the recording material S.

The steering roller 17 is disposed further upstream of the separation roller 19 in terms of the rotation direction of the intermediate transfer belt 7. As described later in detail, the steering roller 17 has an aligning function of controlling a position in a width direction of the intermediate transfer belt 7 intersecting with the rotation direction of the intermediate transfer belt 7 or orthogonal to the rotation direction in the present exemplary embodiment. The steering roller 17 also functions as a tension roller that applies a tension to the intermediate transfer belt 7.

The upstream guide roller 18 is disposed upstream of the secondary transfer inner roller 8 and downstream of the primary transfer rollers 5*a* through 5*d* in terms of the rotation direction of the intermediate transfer belt 7 so as to guide the intermediate transfer belt 7 such that the intermediate transfer belt 7 enters the secondary transfer portion T2 from a constant direction. The upstream guide roller 18 and the separation roller 19 are a pair of stretch rollers disposed upstream and downstream of a part of the intermediate transfer belt 7 facing the plurality of photosensitive drums 1*a* through 1*d* in terms of the rotation direction of the intermediate transfer belt 7. The upstream guide roller 18 is a stretch roller disposed downstream of the part facing the photosensitive drums 1*a* through 1*d* among the pair of stretch rollers. The upstream guide roller 18 and the separation roller 19 can form a transfer surface on which the toner images are transferred from the plurality of photosensitive drums 1*a* through 1*d* onto the intermediate transfer belt 7.

The separation roller 19 serving as a second separation roller is movable and is disposed downstream of the steering roller 17 and upstream of the primary transfer rollers 5*a* through 5*d* in terms of the rotation direction of the intermediate transfer belt 7. The separation roller 19 is capable of changing a stretched cross section which is a cross section along the rotation direction of the intermediate transfer belt 7 by being moved by a separation mechanism 300 serving as a second separation mechanism described later (see FIGS. 8A through 8C). That is, the separation roller 19 corresponds at least to any one stretch member among the plurality of stretch members. As described later in detail, the separation mechanism 300 can separate the outer circumferential surface of the intermediate transfer belt 7 from a part or a whole of the photosensitive drums 1*a* through 1*d* by moving the separation roller 19 and the primary transfer rollers 5*a* through 5*d*.

The toner images of magenta, cyan and black are formed respectively on the photosensitive drums 1*b* through 1*d* by the image forming operation similar to that of the image forming unit Pa also in the other image forming units Pb through Pd. The toner images formed on the photosensitive drums 1*a* through 1*d* are primarily transferred onto the intermediate transfer belt 7 at the primary transfer portions T1*a* through T1*d* by electrostatic biases, i.e., transfer biases, applied to the primary transfer rollers 5*a* through 5*d*. At this time, multiple transferring is made such that the toner images borne on the photosensitive drums 1*a* through 1*d* are superimposed with each other in forming a color image. As the sheet S onto which the toner image has been transferred passes through the primary transfer portions T1*a* through T1*d*, adhesives such as transfer residual toner left on the photosensitive drums 1*a* through 1*d* are removed by the drum cleaner 6.

The toner image borne on the intermediate transfer belt 7 is secondarily transferred onto the recording material S at the secondary transfer portion T2 by the electrostatic bias applied to the secondary transfer outer roller 9. Adhesives such as transfer residual toner left on the intermediate transfer belt 7 after passing through the secondary transfer portion T2 are removed by a belt cleaning unit 11.

In parallel with such image forming operation, the recording material S set in a feed cassette 60 is fed toward a registration roller pair 62 by a feed mechanism 61 such as a sheet feed roller. The registration roller pair 62 is configured to correct a skew of the recording material S and to send the recording material S toward the secondary transfer portion T2 in synchronism with the advance of the image forming operation performed by the image forming units Pa, Pb, Pc and Pd.

The recording material S on which the non-fixed toner image has been transferred in the secondary transfer portion T2 is delivered to a fixing unit 13. The fixing unit 13 includes a heating roller 14 heated by a heat source such as a halogen heater and a counter roller 15 brought into pressure contact with the heating roller 14 and is configured to apply heat and pressure to the toner image while nipping and conveying the recording material S. Thereby, toner particles melt and are secured such that the toner image is fixed to the recording material S.

The recording material S that has passed through the fixing unit 13 is then discharged to a discharge tray 63 provided at an upper part of the apparatus body. In a case of performing duplex printing, the recording material S having first and second surfaces, i.e., front and back surfaces, is flipped through a reverse conveyance path (not illustrated) and is conveyed again to the registration roller pair 62. Then, the recording material S on which another image has been formed on the back surface thereof passes through the secondary transfer portion T2 and the fixing unit 13 and is discharged to the discharge tray 63.

It is noted that an operation display portion 40 that functions as a user interface is provided on an upper surface of the apparatus body. The operation display portion 40 includes a liquid crystal panel capable of displaying present set information and others and various buttons through which the user can input various information and can set so as to switch an output image between a color image and a monochrome image.

The apparatus body is also provided with a control portion 50 serving as a second control portion for integrally controlling the operations of the full-color image forming apparatus 200 based on the information inputted through the operation display portion 40. The control portion 50 includes a CPU (Central Processing Unit), a ROM (Read Only Memory) and a RAM (Random Access Memory). The CPU controls the respective parts while reading programs corresponding to control procedures stored in the ROM. The RAM stores work data and input data and the CPU makes control by making reference to the data stored in the RAM based on the abovementioned program and others.

The apparatus body also includes a patch sensor PS serving as a concentration detecting unit capable of detecting concentration of the toner image borne on the outer circumference of the intermediate transfer belt 7. The patch sensor PS is disposed downstream of the photosensitive drum 1*d* of the most downstream image forming unit Pd and upstream of the upstream guide roller 18 so as to face the outer circumferential surface of the intermediate transfer belt 7 in terms of the rotation direction of the intermediate transfer belt 7. Such patch sensor PS includes a light emitting portion and a photo-sensing portion, for example, and is capable of detecting the concentration of the toner image on the intermediate transfer belt 7 by emitting light from the light emitting portion to the outer circumferential surface of the intermediate transfer belt 7 and by receiving the light reflected by the outer circumferential surface by the photo-sensing portion. The control portion 50 can execute a control for adjusting the concentration of an output image by using the patch sensor PS. For instance, the control portion 50 forms patch images serving as control images on the outer circumferential surface of the intermediate transfer belt 7 per predetermined number of sheets and detects concentration of the patch images by the patch sensor PS. Then, the control portion 50 keeps the concentration of the output image at an adequate level by adjusting an amount of toner to be replenished to the developing unit 4 based on this detection result.

The full-color image forming apparatus 200 constructed as described above can execute a full color mode as a first mode, a separation monochrome mode as a second mode and a contact monochrome mode. The full color mode is a mode of forming toner images by using the plurality of photosensitive drums 1*a* through 1*d*. The separation monochrome mode and the contact monochrome mode are modes of forming a toner image by using one photosensitive drum 1*d* among the plurality of photosensitive drums 1*a* through 1*d*. Only a black toner image is formed on the photosensitive drum 1*d* in the separation monochrome mode in a state in which one photosensitive drum 1*d* is brought into contact with the outer circumferential surface of the intermediate transfer belt 7 and the other photosensitive drums 1*a* through 1*c* are separated from the intermediate transfer belt 7. Meanwhile, the contact monochrome mode is a mode of forming a black toner image only on the photosensitive drum 1*d* and no toner image is formed on the other photosensitive drums 1*a* through 1*c* in a state in which all of the plurality of photosensitive drums 1*a* through 1*d* are brought into contact with the outer circumferential surface of the intermediate transfer belt 7.

The full-color image forming apparatus 200 can also execute a total separation mode of separating all of the plurality of photosensitive drums 1*a* through 1*d* from the intermediate transfer belt 7. The intermediate transfer unit 20 can change the stretched cross section of the intermediate transfer belt 7 so as to execute the respective modes as described later in detail.

Monochrome Image Forming Apparatus

Figure 2:
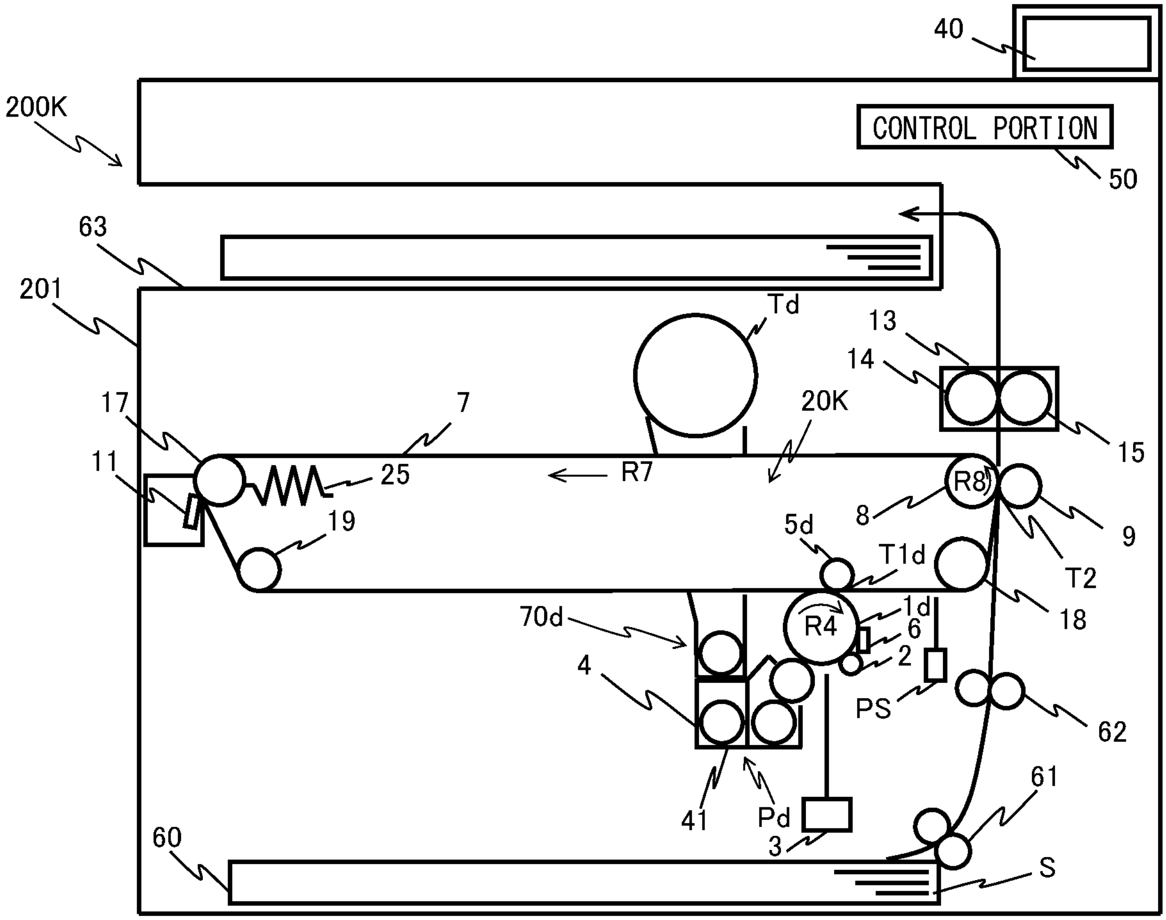
FIG. 2 is a section view schematically illustrating a configuration of a monochrome image forming apparatus of the present exemplary embodiment.

Next, the monochrome image forming apparatus 200K serving as a second image forming apparatus will be described with reference to FIG. 2. The monochrome image forming apparatus 200K is a so-called intermediate transfer type printer including one image forming unit Pd serving as a first image forming unit and an intermediate transfer unit 20K serving as a first intermediate transfer unit corresponding to the monochrome image forming apparatus 200K within a casing 201.

The monochrome image forming apparatus 200K uses the casing 201 in common with that of the full-color image forming apparatus 200 described above and is constructed by removing image forming units Pa, Pb and Pc, developer storage containers Ta, Tb and Tc and replenishing units 70*a*, 70*b* and 70*c* (not illustrated) corresponding to the respective developer storage containers. An intermediate transfer belt 7 serving as a first belt member is wound around a plurality of first stretch rollers including a secondary transfer inner roller 8, a steering roller 17, a separation roller 19 and an upstream guide roller 18 and faces a photosensitive drum 1*d* of the image forming unit Pd at an outer circumferential surface thereof. A position of the photosensitive drum 1*d* serving as a first image bearing member of the monochrome image forming apparatus 200K with respect to the intermediate transfer belt 7 serving as a first belt member is the same as the position of the photosensitive drum 1*d* serving as the second image bearing member of the full-color image forming apparatus 200 with respect to the intermediate transfer belt 7 serving as the second belt member. Because other component elements and operations of the monochrome image forming apparatus 200K are the same as those of the full-color image forming apparatus 200 described above, the same component elements will be denoted by the same reference signs and their description will be omitted here.

It is noted that while the common casing 201 of the full-color image forming apparatus 200 is used as the apparatus body of the monochrome image forming apparatus 200K, a decoration cover may be used dedicatedly for the monochrome image forming apparatus 200K since the decoration cover is used to cover an area from which the image forming units Pa, Pb, Pc and others have been removed. It is noted that the casing 201 in the present exemplary embodiment is a frame part of the image forming apparatus and is constructed by metallic members. Still further, while the casing 201 of the present exemplary embodiment is described by exemplifying a case where the casing 201 of the monochrome image forming apparatus 200K is totally the same as that of the full-color image forming apparatus 200, it need not be totally the same. For instance, marking for discriminating the full-color image forming apparatus 200 from the monochrome image forming apparatus 200K may be provided. Still further, while most parts of the casings are made in common, a reinforcement stay for partially reinforcing only one of the apparatuses may be added. The basic structure of the casing 201 is considered to be substantially the same also in such case.

Still further, in order to prevent the intermediate transfer unit 20 corresponding to the full-color image forming apparatus 200 from being erroneously mounted to the monochrome image forming apparatus 200K, an incompatible structure may be provided such that the intermediate transfer unit 20 cannot be mounted to the monochrome image forming apparatus 200K. In the same manner, an incompatible structure may be provided such that the intermediate transfer unit 20K cannot be mounted to the full-color image forming apparatus 200. The incompatible structure may be provided in either one of the body of the image forming apparatus or of the intermediate transfer unit.

Operations and configurations for forming a toner image on a recording material S based on image information read from a document or inputted from an external device are in common with those of the full-color image forming apparatus 200 other than that the monochrome image forming apparatus 200K includes only one image forming unit Pd. It is noted that configurations and operations of the intermediate transfer unit 20K will be described later.

The monochrome image forming apparatus 200K constructed as described above is capable of executing a monochrome mode and a monochrome total separation mode. The monochrome mode is a mode of forming a toner image by using one photosensitive drum 1*d* serving as a first image bearing member. The monochrome total separation mode is a mode of separating the one photosensitive drum 1*d* from the intermediate transfer belt 7 serving as a first belt. In order to execute such respective modes, the intermediate transfer unit 20K is configured to be capable of changing the stretched cross section of the intermediate transfer belt 7 as described later in detail.

Next, an internal structure of the intermediate transfer unit 20 which is one example of a belt conveyance unit and a structure for steering the intermediate transfer belt 7 will be described with reference to FIGS. 3A through 6B. The intermediate transfer unit 20 illustrated in FIGS. 3A and 3B indicates a configuration in a case where the intermediate transfer unit 20 is mounted to the full-color image forming apparatus 200. Firstly, the configuration of the intermediate transfer unit 20 will be schematically described with reference to FIGS. 3A and 3B. While FIGS. 3A and 3B are perspective views illustrating the intermediate transfer unit 20, FIG. 3A illustrates a state in which the intermediate transfer belt 7 is stretched and FIG. 3B illustrates a state in which the intermediate transfer belt 7 is removed.

Figure 3A:
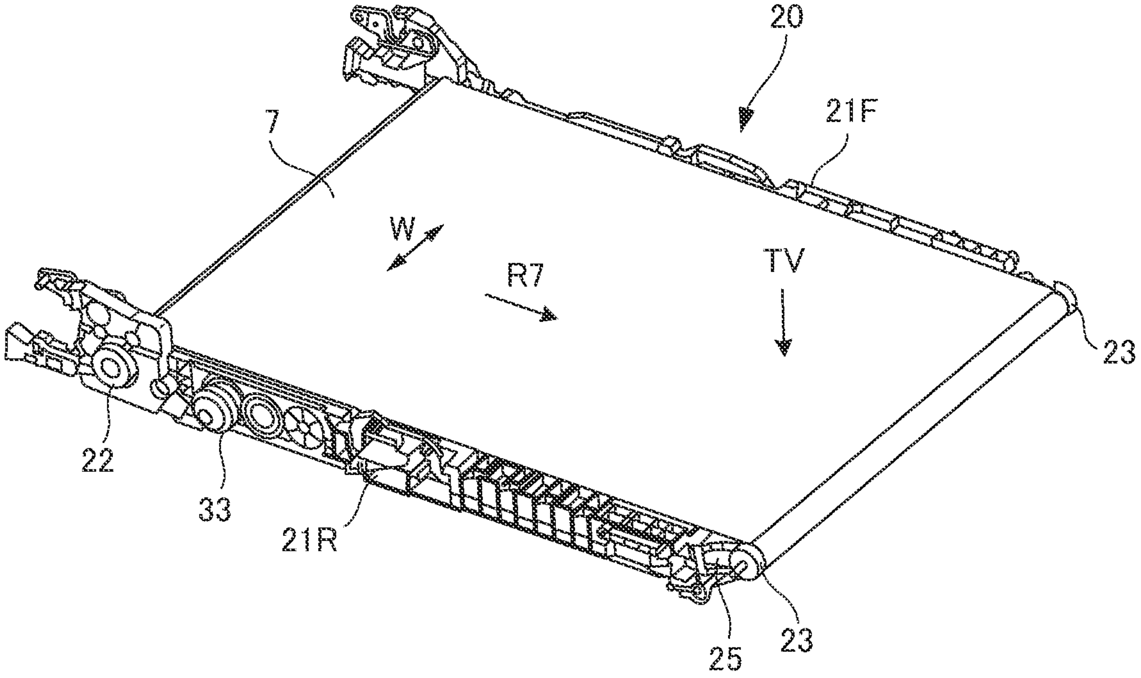
FIG. 3A is a perspective view illustrating a full-color intermediate transfer unit.
Figure 3B:
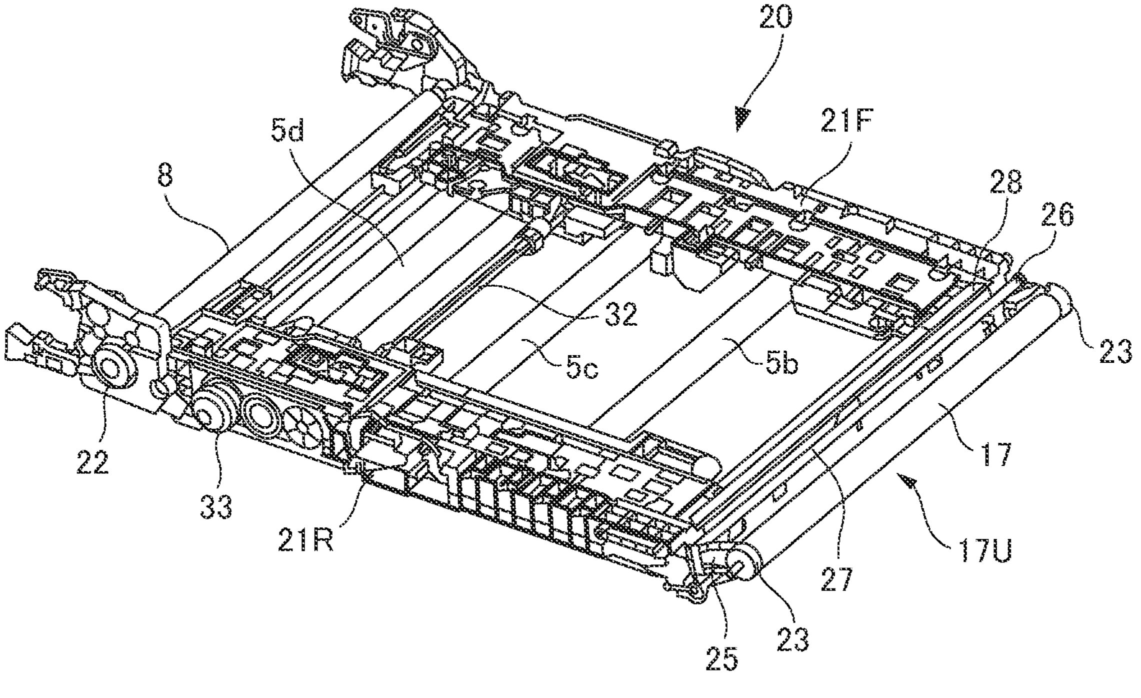
FIG. 3B is a perspective view illustrating the full color intermediate transfer unit from which an intermediate transfer belt is removed.

As illustrated in FIGS. 3A and 3B, the intermediate transfer unit 20 includes front and rear frames 21F and 21R supported by the casing 201. The front frame 21F is a frame member disposed on a front side, i.e., a front direction in FIG. 1 or a side where the user operates, of the intermediate transfer unit 20 and the rear frame 21R is a frame member disposed on an opposite side thereof, i.e., on a rear side. Both ends in a rotation axial direction of the secondary transfer inner roller 8, the upstream guide roller 18 and the separation roller 19 are rotatably borne in a manner of being sandwiched by the front and rear frames 21F and 21R. The rotation axial direction of these rollers 8, 18 and 19 run in parallel with a width direction W of the intermediate transfer belt 7. A belt automatic alignment mechanism 17U including the steering roller 17 and described later is supported by a frame supporting plate 28 extending across the front and rear frames 21F and 21R.

A drive coupling 22 is attached at one end portion in the rotation axial direction of the secondary transfer inner roller 8. The drive coupling 22 is coupled with an output shaft of a belt driving unit (not illustrated) in a state in which the intermediate transfer unit 20 is mounted to the apparatus body to transmit a driving force of the belt driving unit to the secondary transfer inner roller 8. The belt driving unit includes a driving source such as a motor and a coupling member configured to engage with the drive coupling 22 and is mounted in the apparatus body.

A surface of the secondary transfer inner roller 8 is composed of a material having a relatively high friction coefficient such as rubber and conveys and drives the intermediate transfer belt 7 in a direction of an arrow R7 in FIG. 3A as the driving force is transmitted. It is noted that while the drive coupling 22 is used as a drive transmission unit in the present exemplary embodiment, the driving source of the apparatus body may be coupled with the intermediate transfer unit 20 by using an attachable/detachable gear, for example.

Figure 4:
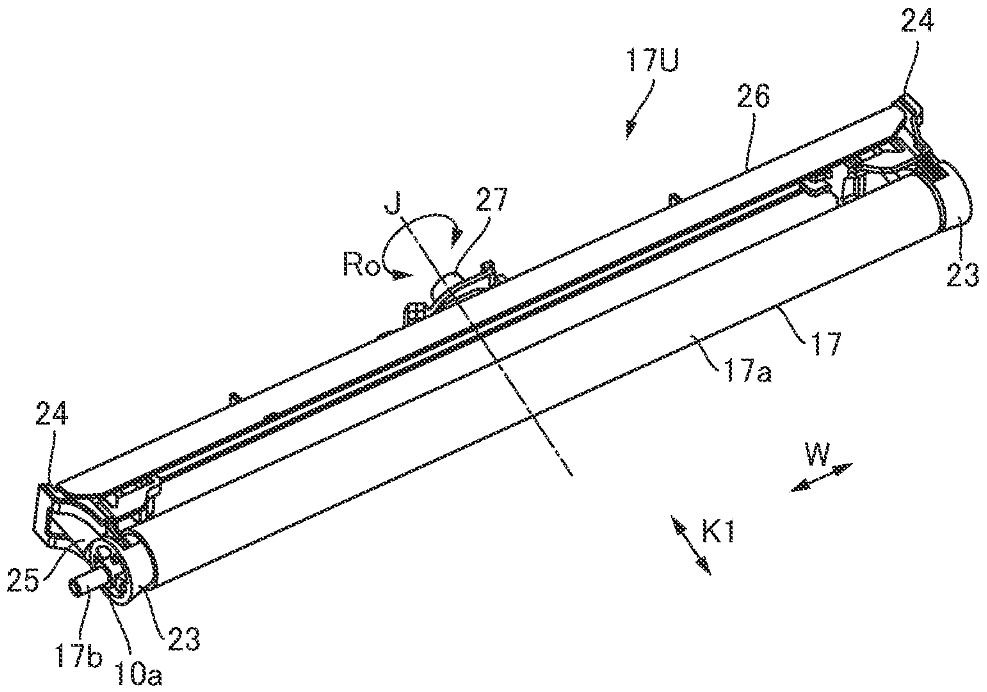
FIG. 4 is a perspective view illustrating a belt automatic alignment mechanism.
Figure 5:
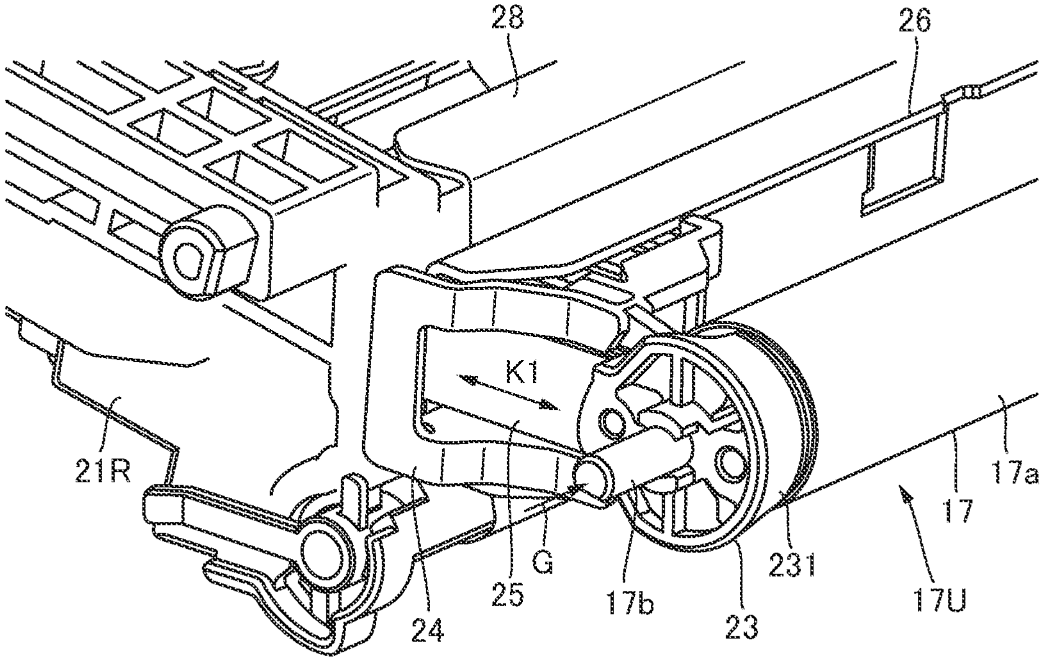
FIG. 5 is an enlarged perspective view illustrating an end portion of the belt automatic alignment mechanism.

As for the intermediate transfer belt 7 driven and conveyed as described above, according to the present exemplary embodiment, the steering roller 17 has a belt automatic alignment mechanism capable of aligning or steering the belt by keeping a balance of frictional forces of the both end portions by itself, i.e., of controlling a widthwise position. A configuration of the belt automatic alignment mechanism 17U which is one example of a steering mechanism will be described below with reference to FIGS. 4 and 5. FIG. 4 is a perspective view illustrating the belt automatic alignment mechanism 17U and FIG. 5 is an enlarged perspective view of an end portion of the belt automatic alignment mechanism 17U.

As illustrated in FIG. 4, the steering roller 17 includes a cylindrical roller body 17*a* and a roller shaft 17*b* projecting from the roller body 17*a* to both sides in the rotation axial direction. Steering bearings 23 are disposed respectively at positions corresponding to the both end portions of the rotation axis of the steering roller 17. The respective roller shafts 17*b* are rotatably borne by the steering bearings 23 in a manner of being inserted into support holes 10*a* provided through the corresponding steering bearings 23.

The pair of steering bearings 23 are attached to the swing plate 26 while supporting both end portions in the axial direction of the steering roller 17, which is one of the plurality of stretch rollers by which the intermediate transfer belt 7 is stretched. The respective steering bearings 23 are supported slidably by slide guides 24 attached to both end portions of the swing plate 26. A tension spring 25 serving as a compression spring is provided contractively between the steering bearing 23 and the slide guide 24.

The swing plate 26 is one example of a swing member supporting in a state in which a relative alignment with the secondary transfer inner roller 8 can be changed by swinging the steering roller 17. The tension spring 25 is also one example of an urging member applying tension acting on an inner circumference of the intermediate transfer belt 7 to the steering roller 17. That is, the tension spring 25 serving as the urging member of the present exemplary embodiment is composed of a pair of spring members respectively applying urging forces to the pair of steering bearings 23 at both end portions of the swing plate 26.

As illustrated in FIGS. 4 and 5, the slide guide 24 has a fitting groove for guiding the steering bearing 23 so as to move along a pressurizing direction of the tension spring 25, i.e., in a direction of an arrow K1. That is, the slide guides 24 compose guide portions for guiding the pair of steering bearings 23 in the urging direction of the tension spring 25. The slide guide 24 also has a stopper (not illustrated) and is capable of restricting the tension spring 25 of the steering bearing 23 from moving in the pressurizing direction of the tension spring 25. This stopper prevents the steering bearing 23 and the steering roller 17 from falling in an assembly state in which the belt automatic alignment mechanism 17U is not mounted to the intermediate transfer unit 20. These arrangements make it possible to effectively transmit the urging forces of the tension springs 25 at both end portions to the respective corresponding steering bearings 23.

In a state in which the intermediate transfer belt 7 is stretched by the steering roller 17 and the other roller members 8, 18 and 19 as illustrated in FIG. 3A, the steering bearings 23 move in a direction of compressing the tension spring 25 from a position restricted by the stopper. Accordingly, the steering roller 17 is pressed against the inner circumferential surface of the intermediate transfer belt 7 by a resilient force of the tension spring 25 and a tension is generated in the intermediate transfer belt 7 in this state. That is, the steering roller 17 of the present exemplary embodiment functions also as a tension roller that applies an adequate tension to the intermediate transfer belt 7 by the urging force from the urging member.

As illustrated in FIG. 4, the swing plate 26 serving as a swing member is fixed in a state in which a pivot shaft member 27 serving as a support shaft disposed at a widthwise center portion of the swing plate 26 projects rearward in FIG. 4, and the slide guides 24 are fixed respectively at both end portions of the swing plate 26. The pivot shaft member 27 supports the swing plate 26 rotatably or swingably by being pivotably fitted into a fitting portion (not illustrated) provided through the frame supporting plate 28.

Thereby, the swing plate 26 can swing in a swing direction Ro while supporting the steering roller 17 centering on a steering axis J which is an axis of the pivot shaft member 27. That is, the belt automatic alignment mechanism 17U which is one example of an alignment changing unit for changing an alignment of the belt member is constructed as a swingable unit with respect to the frame of the intermediate transfer unit 20 together with the steering roller 17.

Operational Principle of Belt Automatic Alignment Mechanism

Figure 6A:
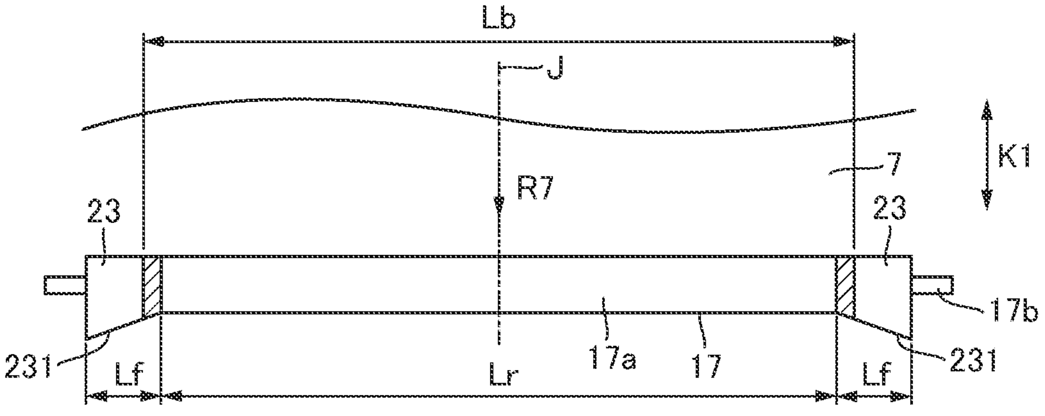
FIG. 6A is a schematic diagram illustrating a belt winding area in a belt stationary state.
Figure 6B:
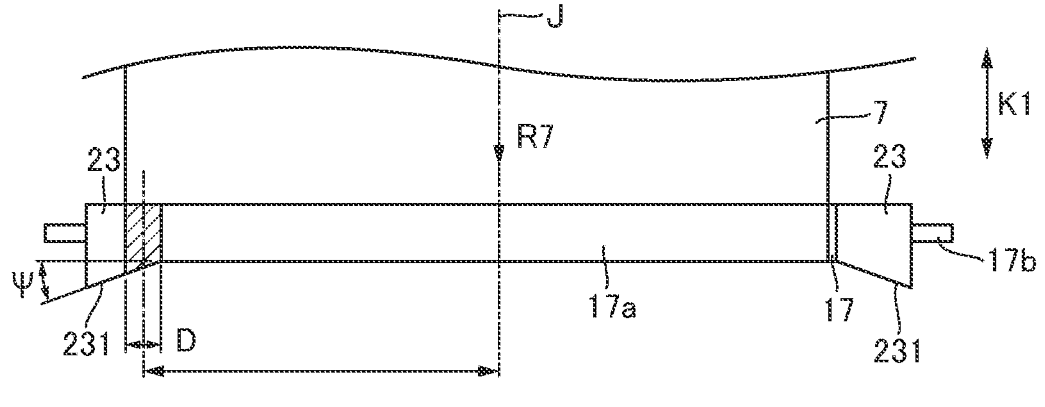
FIG. 6B is a schematic diagram illustrating a belt winding area in a state in which the belt is displaced.

Next, configurations and operations of the belt automatic alignment mechanism 17U of the present exemplary embodiment will be described in detail with reference to FIGS. 5, 6A and 6B. Both of FIGS. 6A and 6B are plan views or upper sight views at a point of view directed in a direction of an arrow TV in FIG. 3A. FIG. 6A illustrates a stationary state in which widthwise forces acting on the intermediate transfer belt 7 are balanced by the operation of the belt automatic alignment mechanism 17U, i.e., a state in which a hanging position of the intermediate transfer belt 7 is located at a nominal position. FIG. 6B illustrates a state in which the intermediate transfer belt 7 leans toward the left side in FIG. 6B when the intermediate transfer belt 7 is conveyed in a direction of an arrow R7.

As illustrated in FIG. 5 the steering bearing 23 configured to bear the roller shaft 17*b* includes a rubbing surface 231 for generating a steering torque by being brought into sliding contact with the inner circumferential surface of the intermediate transfer belt 7. Here, the steering torque refers to a moment of a force that tries to change the alignment of the steering roller 17 in a direction in which the leaning of the intermediate transfer belt 7 can be reduced. The moving direction of the steering bearing 23 is limited so as to move in the direction of the arrow K1 by the slide guide 24 as described above. Therefore, the steering bearing 23 which is one example of a friction portion comes into slidable contact with the inner circumferential surface of the belt without being driven when the intermediate transfer belt 7 is conveyed and driven in the direction of the arrow R7.

The rubbing surface 231 is formed into a tapered shape such that an outer diameter thereof gradually increases as it approaches the outside in the axial direction of the steering roller 17 and has a maximum diameter which is larger than the outer diameter of the cylindrical steering roller 17. In the present exemplary embodiment, the outer diameter of the steering roller 17 is set at 16 mm, for example, as illustrated in FIG. 6B. While the rubbing surface 231 of the steering bearing 23 has a cylindrical outer circumferential portion of 16 mm at a joint portion with the steering roller 17, the rubbing surface 231 has a curved shape in which the outer diameter gradually increases from the outer circumferential portion toward the outside with a rate of a taper angle ψ of 10 degrees.

Still further, according to the present exemplary embodiment, a size of the intermediate transfer belt 7 in the width direction, i.e., in a direction orthogonal to the conveyance and driven direction or the direction of the arrow R7, of the intermediate transfer belt 7 is set so as to partly extend over areas of the rubbing surfaces 231 having the taper angle ψ. In other words, a width Lb of the intermediate transfer belt 7 is set to be longer than an axial length (Lr) of a roller body of the steering roller 17 and to be shorter than a width (Lr+2Lf) between both ends of the steering bearings 23 (Lr<Lb<Lr+2Lf). Here, Lf is a widthwise length of the rubbing surface 231 of each steering bearing 23.

The operational principle that enables the belt automatic alignment by bringing the intermediate transfer belt 7 into slidable contact with the steering bearing 23 will be described with reference to FIGS. 6A and 6B. Because the steering bearing 23 is supported so as not be driven by the intermediate transfer belt 7 as described above, the steering bearing 23 can slide in contact with the inner circumferential surface of the belt during when the intermediate transfer belt 7 is driven and conveyed. At this time, because a frictional force is generated in an area where the intermediate transfer belt 7 is wrapped around the steering bearing 23, i.e., in an area on a right side where the intermediate transfer belt 7 heads downward in a view from a direction of an arrow G in FIG. 5, a downward frictional force acts on the steering bearing 23.

As described above, the width (Lb) of the intermediate transfer belt 7 is set so as to extend over the rubbing surfaces (tapered slidable contact surfaces) 231 of the steering bearings 23. Accordingly, the intermediate transfer belt 7 slides in contact with the rubbing surfaces 231 of both steering bearings 23 with an equal hanging width of 2 mm, for example, in a stationary state or in the nominal state as illustrated in FIG. 6A. In this state, moments generated by the frictional forces acting on both steering bearings 23 from the intermediate transfer belt 7 cancel with each other.

That is, the frictional forces received by the steering bearings 23 from the intermediate transfer belt 7 act as moments in opposite directions with each other centering on the steering axis J on the steering bearings 23 and on the swing plate 26. Therefore, the frictional forces received by the respective steering bearings 23 are approximately equal and the moments cancel with each other, so that a posture of the swing plate 26 is maintained. Thereby, the steering roller 17 is kept at a posture by which an axial direction thereof is approximately paralleled with those of the other roller members such as the secondary transfer inner roller 8, i.e., in a state in which the alignment is kept.

In contrast to that, in a state in which the intermediate transfer belt 7 deviates widthwise to either one side, i.e., in a state in which a so-called leaning occurs, a hanging width of the intermediate transfer belt 7 to one steering bearing 23 increases more than a hanging width of the intermediate transfer belt 7 to the other steering bearing 23. In the example illustrated in FIG. 6B, a hanging width of the intermediate transfer belt 7 to the left steering bearing 23 is D mm and a hanging width of the intermediate transfer belt 7 to the right steering bearing 23 is zero. That is, it is a state in which the intermediate transfer belt 7 deviates from the rubbing surface 231.

In this case, if a vertically downward frictional force received by a range of a certain hanging width of the rubbing surface 231 from the intermediate transfer belt 7 is F(ST), a magnitude of the force received by one steering bearing 23 is F(ST)×D. Meanwhile, because the hanging width of the other steering bearing 23 is zero, the steering bearing 23 receives substantially no force from the intermediate transfer belt 7. Accordingly, the steering torque that tries to move the left end portion of the steering roller 17 downward, i.e., in a rear side in FIG. 6B, is generated in a state as illustrated in FIG. 6B.

A steering angle of the steering roller 17 generated by the abovementioned principle, i.e., an inclination angle of the steering roller 17 in a state in which the steering roller 17 swings in accordance to the steering torque, coincides with a direction of returning the leaning of the intermediate transfer belt 7 to the original state. Accordingly, the leaning of the intermediate transfer belt 7 is reduced along with the conveyance of the belt. That is, the belt automatic alignment mechanism 17U exhibits the automatic aligning effect of controlling the widthwise position of the intermediate transfer belt 7 by converting a part of a driving force for conveying and driving the intermediate transfer belt 7 into the steering torque.

It is noted that the present exemplary embodiment is configured to avoid an abrupt steering operation by setting a relatively low coefficient of friction μS by providing the taper angle ψ on the steering bearing 23. Specifically, a favorable result can be obtained by using resin material such as POM (polyacetal) having a sliding and rubbing property, i.e., low frictionality, as a material of the steering bearing 23 and by setting the coefficient of friction μS to be around 0.3 and the taper angle ψ to be around 5 to 10 degrees. Still further, electric conductivity is applied to the steering bearing 23 by taking an electrostatic ill effect caused by frictional charge with the intermediate transfer belt 7 into consideration. However, it is also possible to adopt another configuration having a different taper angle ψ and a rubbing property as long as a required steering torque can be obtained. For instance, the rubbing surface 231 of the steering bearing 23 may be formed into a cylindrical shape.

Next, the separation mechanism 300 serving as the second separation mechanism for enabling the intermediate transfer belt 7 to separate from the photosensitive drums 1*a* through 1*d* will be described with reference to FIGS. 7 and 8A through 8C. The separation mechanism 300 serving as a movement mechanism includes a separation slider 30 serving as a slide member and a separation cam 31 serving as a cam member. The control portion 50 serving as a second control portion is capable of changing the stretched cross section which is a cross section along the rotation direction of the intermediate transfer belt 7 by moving the separation roller 19 which is at least either stretch member of the plurality of stretch members by controlling the separation mechanism 300. The separation mechanism 300 is also capable of moving the plurality of primary transfer rollers 5*a* through 5*d*. Then, in a case where the intermediate transfer unit 20 is mounted in the full-color image forming apparatus 200, the separation mechanism 300 is capable of changing the stretched cross section of the intermediate transfer belt 7 corresponding to the full color mode, the separation monochrome mode, the contact monochrome mode and the total separation mode.

Figure 8A:
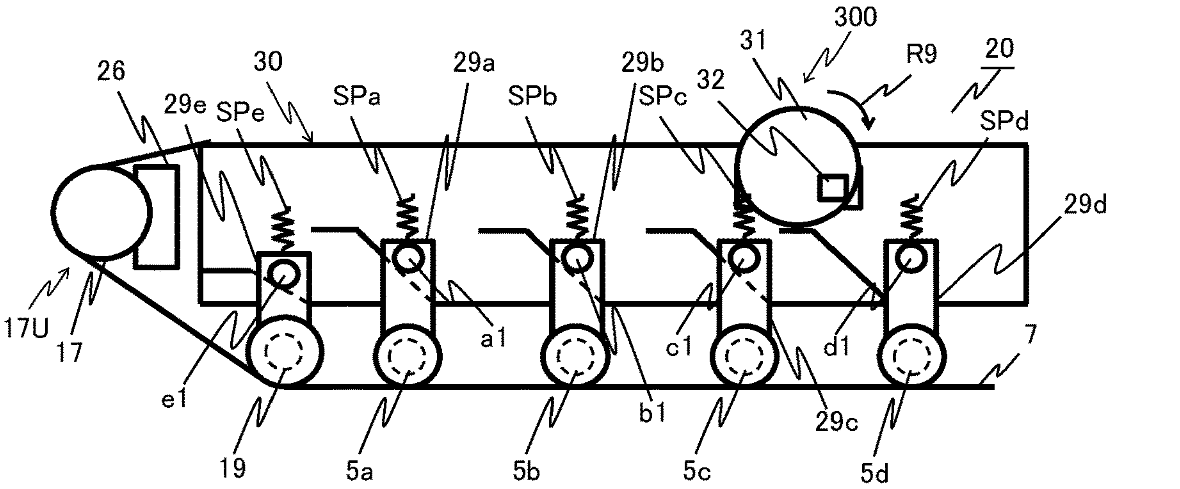
FIG. 8A is a schematic diagram illustrating a state of a separation mechanism in a full color mode in the full color intermediate transfer unit.
Figure 8B:
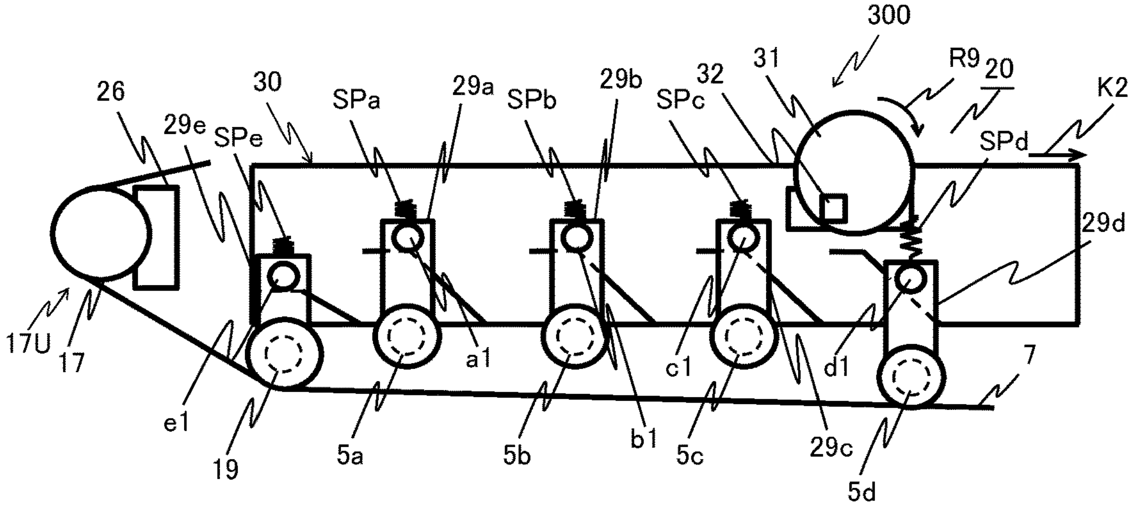
FIG. 8B is a schematic diagram illustrating a state of the separation mechanism in the separation monochrome mode in the full-color intermediate transfer unit.
Figure 8C:
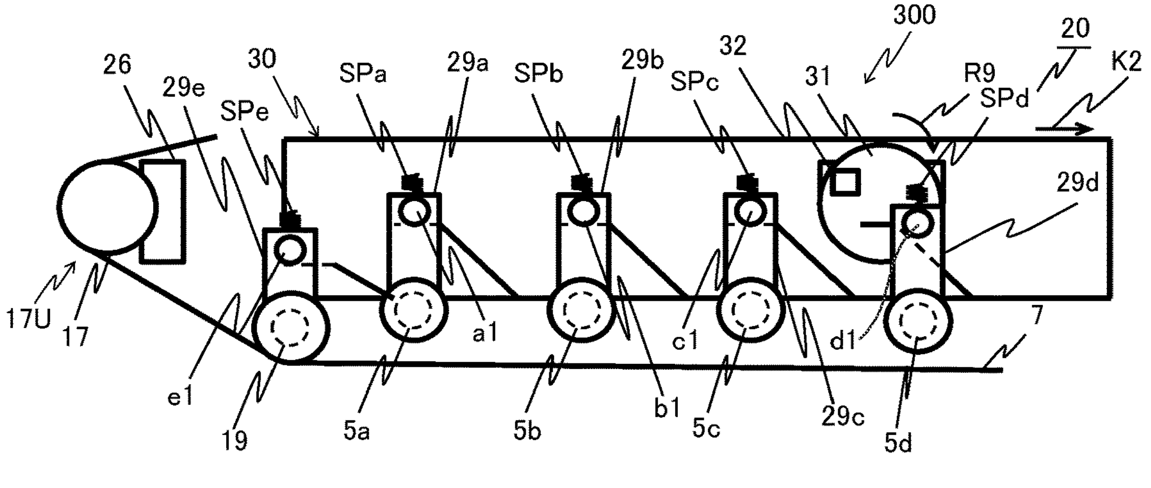
FIG. 8C is a schematic diagram illustrating a state of the separation mechanism in a total separation mode in the full-color intermediate transfer unit.

Specifically, the stretched cross section of the intermediate transfer belt 7 assumes the first stretched cross section as illustrated in FIG. 8A in the full color mode, i.e., in the first mode, and in the contact monochrome mode. In the first stretched cross section, the outer circumferential surface of the intermediate transfer belt 7 is in contact with all of the plurality of photosensitive drums 1*a* through 1*d*. In the separation monochrome mode, i.e., in the second mode, the stretched cross section of the intermediate transfer belt 7 assumes the second stretched cross section as illustrated in FIG. 8B. In the second stretched cross section, the outer circumferential surface of the intermediate transfer belt 7 is in contact with one photosensitive drum 1*d* and separates from the other photosensitive drums 1*a* through 1*c*. The stretched cross section of the intermediate transfer belt 7 assumes a fourth stretched cross section as illustrated in FIG. 8C in the total separation mode. In the fourth stretched cross section, the outer circumferential surface of the intermediate transfer belt 7 separates from all of the plurality of photosensitive drums 1*a* through 1*d*.

In short, FIGS. 8A through 8C are related with the stretched cross sections as follows:

FIG. 8A: First stretched cross section (full color mode (first mode or CL mode) and contact monochrome mode)

FIG. 8B: Second stretched cross section (separation monochrome mode (second mode or BK mode))

FIG. 8C: Fourth stretched cross section (total separation mode)

The configuration for separating the intermediate transfer belt 7 by the separation mechanism 300 will be specifically described below. As described above, the primary transfer rollers 5*a* through 5*d* respectively facing the photosensitive drums 1*a* through 1*d* of the image forming units Pa through Pd are disposed on the inner circumferential side of the intermediate transfer belt 7 (see FIG. 1). These primary transfer rollers 5*a* through 5*d* and the separation roller 19 positioned upstream of the primary transfer rollers 5*a* through 5*d* can be moved relatively with respect to the frame member of the intermediate transfer unit 20.

Figure 7:
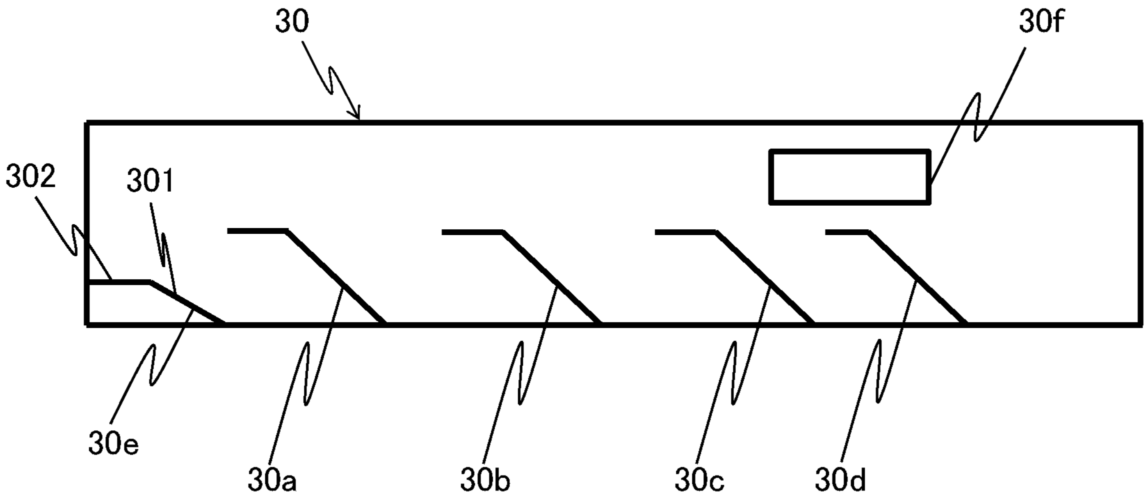
FIG. 7 is a schematic diagram illustrating a separation slider of the present exemplary embodiment.

The move of the primary transfer rollers 5*a* through 5*d* and the separation roller 19 is made by a slide motion of the separation slider 30 illustrated in FIG. 7. FIG. 7 illustrates a state of the separation slider 30 seen from the front side. The separation sliders 30 are stored respectively within the front and rear frames 21F and 21R of the intermediate transfer unit 20 (see FIG. 3) and have the same shape. That is, the respective separation sliders 30 have four cam surfaces 30*a*, 30*b*, 30*c* and 30*d* corresponding to the primary transfer rollers 5*a* through 5*d* and a cam surface 30*e* corresponding to the separation roller 19. The two separation sliders 30 slide in synchronism with respect to the front and rear frames 21F and 21R in a lateral direction in FIG. 8, i.e., in a direction in which the primary transfer rollers 5*a* through 5*d* are arrayed or a direction orthogonal to the rotation axial direction of the primary transfer rollers 5*a* through 5*d*, as a moving direction.

Each of the cam surfaces 30*a* through 30*e* includes an inclined surface inclined in a slide direction of the separation slider 30 to be able to achieve an operation of each of the rollers 5*a* through 5*d* and 19 in switching modes as described below. For instance, the cam surface 30*e* corresponding to the separation roller 19 includes a flat portion 302 corresponding to a middle stage position of the separation roller 19 and an inclined surface 301 extending from the flat portion 302 in terms of the slide direction and corresponding to a lower stage position of the separation roller 19. The same applies also to the cam surfaces 30*a* through 30*d*.

As illustrated in FIGS. 8A through 8C, both axial ends of the primary transfer rollers 5*a* through 5*d* are borne rotatably by the corresponding primary transfer bearings 29*a* through 29*d*. The primary transfer bearings 29*a* through 29*d* are disposed on both axial ends of the primary transfer rollers 5*a* through 5*d* and are supported by the front and rear frames 21F and 21R, respectively. Either of the primary transfer bearings 29*a* through 29*d* is also supported by the front and rear frames 21F and 21R in a state of being engaged movably in a vertical direction in FIG. 8, i.e., in a direction orthogonal to the moving direction of the separation slider 30 or in a direction orthogonal to the rotation axial direction of the primary transfer rollers 5*a* through 5*d*. Still further, the primary transfer bearings 29*a* through 29*d* are restricted from moving in the direction along the conveyance direction i.e., in the direction of the arrow R7, of the intermediate transfer belt 7.

The respective primary transfer bearings 29*a* through 29*d* are provided with contact portions a1 through dl in contact with the cam surfaces 30*a* through 30*d* of the separation slider 30. Still further, primary transfer springs SPa through SPd urging downward in FIG. 8 so as to press the primary transfer bearings 29*a* through 29*d* toward the cam surfaces 30*a* through 30*d* are provided between the primary transfer bearings 29*a* through 29*d* and the front and rear frames 21F and 21R. An urging direction of the primary transfer springs SPa through SPd is a direction in which the primary transfer rollers 5*a* through 5*d* are directed to the photosensitive drums 1*a* through 1*d*.

As the separation slider 30 slides and moves laterally in FIG. 8, the primary transfer bearings 29*a* through 29*d* move in the vertical direction in FIG. 8 in a state in which the contact portions a1 through dl are in contact with the cam surfaces 30*a* through 30*d*, so that the primary transfer rollers 5*a* through 5*d* move.

A movement configuration similar to that of the primary transfer rollers 5*a* through 5*d* is provided also for the separation roller 19. That is, both axial ends of the separation roller 19 are rotatably borne by separation roller bearings 29*e* disposed at both axial ends. The respective separation roller bearings 29*e* are held in a state in which the separation roller bearings 29*e* are movable in the vertical direction in FIG. 8 by the front and rear frames 21F and 21R and are restricted from moving along the conveyance direction of the intermediate transfer belt 7, i.e., in the direction of the arrow R7. Still further, the separation roller bearing 29*e* includes a contact portion el in contact with the cam surface 30*e* of the separation slider 30 and is pressed to the cam surface 30*e* by a separation roller spring SPe. As the separation slider 30 slidably moves in the lateral direction in FIG. 8, the separation roller bearing 29*e* moves in the vertical direction in FIG. 8 in a state in which the contact portion el is in contact with the cam surface 30*e*. Thereby, the separation roller 19 moves.

The separation slider 30 includes a slide urging surface 30*f* (see FIG. 7) engaging with the separation cam 31 attached to a separation cam shaft 32 and is urged in the lateral direction in FIG. 8 as the slide urging surface 30*f* is pressed by the separation cam 31. Separation couplings 33 (see FIG. 3) drivingly coupled with a driving source such as a motor mounted in the apparatus body are attached to axial ends of the separation cam shaft 32 in a state in which the intermediate transfer unit 20 is mounted to the apparatus body.

The separation slider 30 corresponds to a movable member capable of moving in a direction intersecting with a moving direction, i.e., the vertical directions in FIGS. 8A through 8C, of the separation roller bearing 29*e* corresponding to the bearing member of the present exemplary embodiment. The separation roller spring SPe corresponds to an urging unit that causes the bearing member to follow the cam surface by urging the bearing member toward the cam surface.

According to the present exemplary embodiment, the primary transfer rollers 5*a* through 5*d* and the separation roller 19 are moved by the separation mechanism 300 including the separation slider 30 and the separation cam 31 to switch the modes as illustrated respectively in FIGS. 8A through 8C. The following mode switching operation is achieved by controlling a rotational phase of the separation cam shaft 32 based on a control signal emitted from the control portion 50 (see FIG. 1) mounted in the full-color image forming apparatus 200. While the operation will be described by exemplifying cases of switching in an order of the full color mode, i.e., a CL mode, the separation monochrome mode, i.e., a BK mode, and the total separation mode, it is possible to switch at any modes by following the operation inversely.

In the full color mode, i.e., in the CL mode, as illustrated in FIG. 8A, all of the primary transfer rollers 5*a* through 5*d* and the separation roller 19 are held at the lower stage position and the intermediate transfer belt 7 is in contact with the photosensitive drums 1*a* through 1*d* of the respective image forming units Pa through Pd. That is, the primary transfer roller 5*d* is positioned at a first position and the separation roller 19 is positioned at a second position. In this state, it is possible to form a color image on a recording material by executing an image forming operation by the respective image forming units Pa through Pd and by transferring toner images formed on the photosensitive drums 1*a* through 1*d* onto the recording material through the intermediate transfer belt 7.

In a case of switching from the CL mode to the separation monochrome mode, i.e., the BK mode, as illustrated in FIG. 8B, the separation cam 31 rotates by 90 degrees in a direction of an arrow R9 and the separation slider 30 slides toward the right side, i.e., in a direction of an arrow K2, in FIG. 8B. In the BK mode, the primary transfer rollers 5*a* through 5*c* move to an upper stage position to separate from the inner circumferential surface of the intermediate transfer belt 7 and the separation roller 19 moves to a middle stage position. At this time, the intermediate transfer belt 7 is stretched by the separation roller 19 at the middle stage position and the primary transfer roller 5*d* of black at the lower stage position and is separated from the photosensitive drums 1*a* through 1*c* but is in contact with the primary transfer roller 5*d* of black. In this state, it is possible to form a monochrome image onto a recording material by executing an image forming operation by the image forming unit Pd of black and by transferring a toner image formed on the photosensitive drum 1*d* to the recording material through the intermediate transfer belt 7.

In a case of switching from the BK mode to the total separation mode as illustrated in FIG. 8C, the separation cam 31 rotates further by 90 degrees in the direction of the arrow R9 and the separation slider 30 slides toward the right side, i.e., in the direction of the arrow K2, in FIG. 8C. In the total separation mode, all of the primary transfer rollers 5*a* through 5*d* move to the upper stage position to separate from the inner circumferential surface of the intermediate transfer belt 7 and the separation roller 19 moves to the upper stage position. At this time, the intermediate transfer belt 7 is stretched by the separation roller 19 at the upper stage position and the upstream guide roller 18 (see FIG. 1) and is separated from all of the photosensitive drums 1*a* through 1*d*. The control portion 50 controls the separation mechanism 300 to assume the total separation mode in a case of waiting for a signal of the full-color image forming apparatus 200, e.g., a print job, of instructing to start an image forming operation, besides a case of undertaking replacement of the intermediate transfer unit 20.

The separation roller 19 is one example of the roller members by which the belt member is stretched, and the lower stage position in FIG. 8A corresponds to the second position and the upper stage position in FIGS. 8B and 8C corresponds to the third position in which the separation roller 19 is moved to the inner circumferential side of the belt member as compared to the second position. In a case of executing the full color mode, the control portion 50 moves the separation roller 19 to the second position and in a case of executing the separation monochrome mode, the control portion 50 moves the separation roller 19 to the third position. The separation mechanism 300 is one example of a movement mechanism for moving such roller member to the second and third positions.

Here, in a case where a type of the recording material is that having a grammage of 150 g/m$^2$ or more, for example, there is a case where an impact caused when the recording material enters the secondary transfer portion T2 propagates to the intermediate transfer belt 7 and vibrates the photosensitive drum 1*d*. Because it is effective to increase the tension of the intermediate transfer belt 7 to suppress the propagation of the impact, it is desirable to switch to the CL mode as illustrated in FIG. 8A also in forming a monochrome image onto a recording material.

Then, the present exemplary embodiment is arranged such that the monochrome mode of forming an image by one color of black can be executed by a contact monochrome mode, i.e., a sixth mode, besides the separation monochrome mode described above. For instance, the control portion 50 may be arranged so as to execute the contact monochrome mode in forming a monochrome image on a recording material having a predetermined value of grammage of 150 g/m$^2$ or more. It is also possible to arrange such the user can select the separation monochrome mode or the contact monochrome mode from the operation display portion 40 or the like.

In the contact monochrome mode, all of the primary transfer rollers 5*a* through 5*d* and the separation roller 19 are held at the lower stage position and the intermediate transfer belt 7 comes into contact with the photosensitive drums 1*a* through 1*d* (see FIG. 1) of the respective image forming units Pa through Pd as illustrated in FIG. 8A. In executing the contact monochrome mode, while a toner image is formed on the photosensitive drum 1*d* of black, no toner image is formed on the other photosensitive drums 1*a* through 1*c*. However, because the other photosensitive drums 1*a* through 1*c* are in contact with the intermediate transfer belt 7, it is preferable to rotate the respective photosensitive drums and to charge the surface of the photosensitive drums by the charging unit 2 in forming an image. That is, although the image forming units Pa, Pb and Pc execute an image forming operation at this time, the exposing units 3 corresponding to the image forming units of yellow, magenta and cyan form no electrostatic latent image on the surface of the drums.

Still further, the tension of the intermediate transfer belt 7 is higher in the first stretched cross section illustrated in FIG. 8A than that of the second stretched cross section illustrated in FIG. 8B, so that the intermediate transfer belt 7 can be driven stably. Due to that, it is preferable to execute the control based on the concentration of the patch image detected by the patch sensor PS described above in the state of the first stretched cross section. It is because detection accuracy drops if a distance between the detection surface of the patch sensor PS and the outer circumferential surface of the intermediate transfer belt 7 varies if the intermediate transfer belt 7 is not driven stably.

Then, according to the present exemplary embodiment, the control portion 50 executes the control using the patch sensor PS periodically or appropriately in the full color mode. Meanwhile, in the monochrome mode, the control portion 50 executes the control using the patch sensor PS in a case where the contact monochrome mode is being executed. That is, the control portion 50 executes the control using the patch sensor PS in a case where the stretched cross section of the intermediate transfer belt 7 is the first stretched cross section as illustrated in FIG. 8A.

Mounting and Removal of Intermediate Transfer Unit

Next, a configuration for mounting and removing the intermediate transfer unit 20 to/out of the apparatus body in replacing the intermediate transfer belt 7 or the like will be described. The intermediate transfer unit 20 illustrated in FIG. 9 can be mounted to and removed out of the apparatus body of the full-color image forming apparatus 200 in a state of being held in the total separation mode described above. That is, the intermediate transfer unit 20 can be mounted to and removed out of the apparatus body in a state of the fourth stretched cross section as illustrated in FIG. 8C.

Specifically, the intermediate transfer unit 20 is exposed by opening a right door RD provided on the right side in view from the front side of the apparatus body and can be removed out of the apparatus body by moving in the lateral direction, i.e., in a direction of an arrow K3.

Monochrome Intermediate Transfer Unit

Figure 10A:
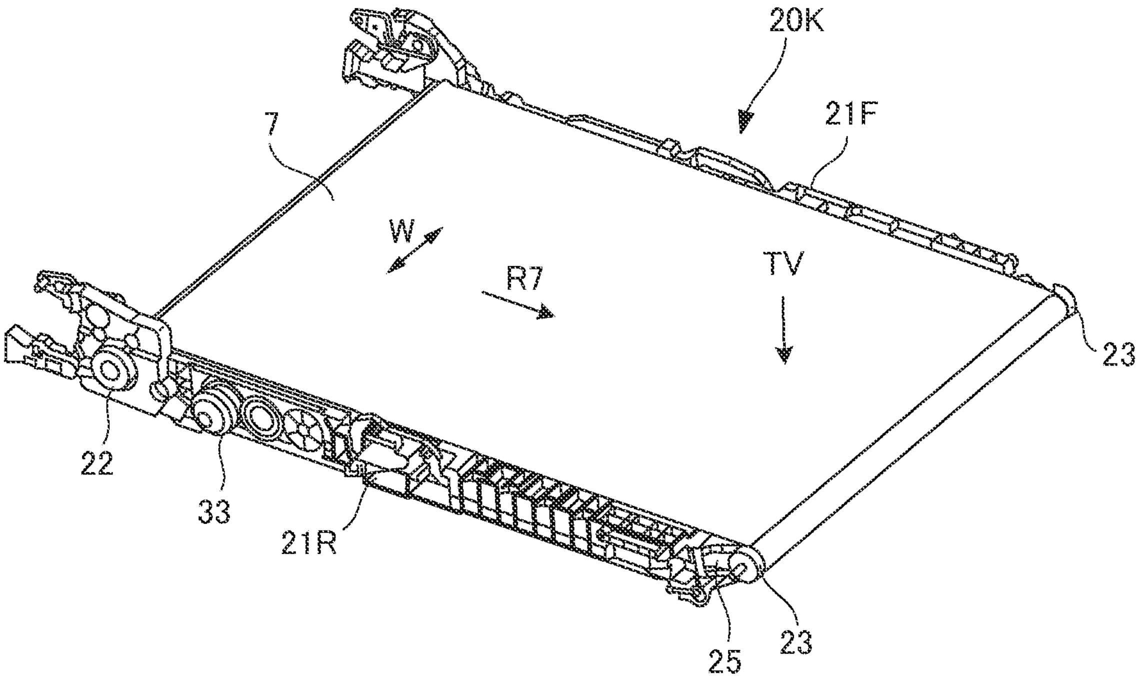
FIG. 10A is a perspective view illustrating a monochrome intermediate transfer unit.
Figure 10B:
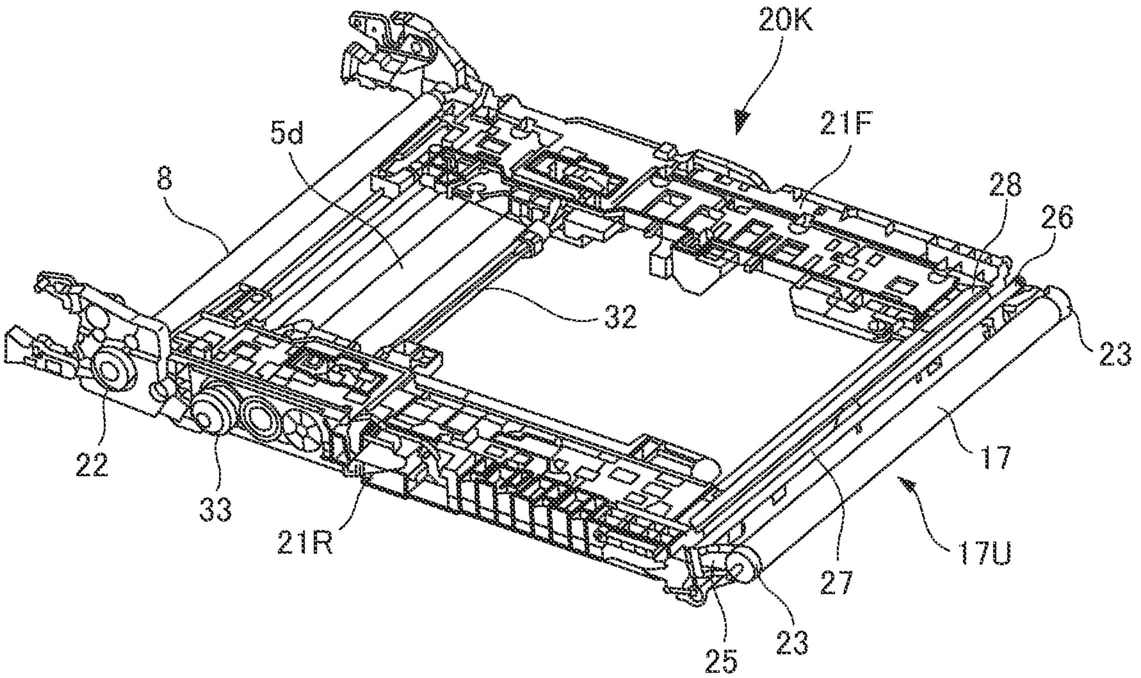
FIG. 10B is a perspective view illustrating the monochrome intermediate transfer unit from which the intermediate transfer belt is removed.

Next, an internal structure of the intermediate transfer unit 20K corresponding to the monochrome image forming apparatus 200K will be described with reference to FIGS. 10A and 10B. FIGS. 10A and 10B are perspective views illustrating the intermediate transfer unit 20K, wherein FIG. 10A illustrates a state in which the intermediate transfer belt 7 is stretched and FIG. 10B illustrates a state in which the intermediate transfer belt 7 is removed.

The intermediate transfer unit 20K corresponds to a unit in which the primary transfer rollers 5*a* through 5*c*, the primary transfer bearings 29*a* through 29*c* and the primary transfer springs SPa through SPc are removed out of the intermediate transfer unit 20 corresponding to the full-color image forming apparatus 200 described above. This arrangement enables to cut costs with respect to the intermediate transfer unit 20. It is noted that the structure otherwise is the same as that of the intermediate transfer unit 20. That is, the primary transfer rollers 5*a* through 5*c* and other members are just removed from the intermediate transfer unit 20 and the other structure are in common. That is, the basic structure of the intermediate transfer unit 20K is made in common with that of the intermediate transfer unit 20 corresponding to the full-color image forming apparatus 200 described above. It is noted that the case where the intermediate transfer unit is totally the same in the full-color image forming apparatus 200 and in the monochrome image forming apparatus 200K other than that the primary transfer rollers 5*a* through 5*c* and other members described above are removed is exemplified in the present exemplary embodiment, they need not be always totally the same. For instance, marking for discriminating the intermediate transfer unit of the full-color image forming apparatus 200 from the intermediate transfer unit of the monochrome image forming apparatus 200K may be provided. Still further, while most parts of the casings, i.e., the frames, of the intermediate transfer units are made in common, a reinforcement stay for partially reinforcing only one apparatus may be added. The basic structure of the intermediate transfer unit is considered to be substantially the same also in such case.

Accordingly, positions where the stretch rollers 8, 17, 18 and 19 for stretching the intermediate transfer belt 7 and the separation mechanism 300, i.e., the first separation mechanism, of the separation roller 19, i.e., the first separation roller, are the same in the intermediate transfer unit 20 and the intermediate transfer unit 20K. The structures for steering the intermediate transfer belt 7 are also the same. Therefore, the same structures of the intermediate transfer unit 20K with those of the intermediate transfer unit 20 will be denoted by the same reference signs and their description will be omitted below.

Separation Mechanism of Intermediate Transfer Belt in Monochrome Intermediate Transfer Unit Next, a configuration for enabling the intermediate transfer belt 7 of the monochrome intermediate transfer unit 20K to separate from the photosensitive drum 1*d* will be described with reference to FIGS. 11A and 11B. The intermediate transfer unit 20K also includes the abovementioned separation mechanism 300. Then, the control portion 50 serving as a first control portion is capable of changing the stretched cross section which is a cross section of the intermediate transfer belt 7 along the rotation direction thereof by moving the separation roller 19 by controlling the separation mechanism 300. The separation mechanism 300 is also capable of moving one primary transfer roller 5*d*. Then, in a case where the intermediate transfer unit 20K is mounted in the monochrome image forming apparatus 200K, the separation mechanism 300 is capable of changing the stretched cross section of the intermediate transfer belt 7 corresponding to the monochrome mode as a third mode and the monochrome total separation mode as a fifth mode.

Figure 11A:
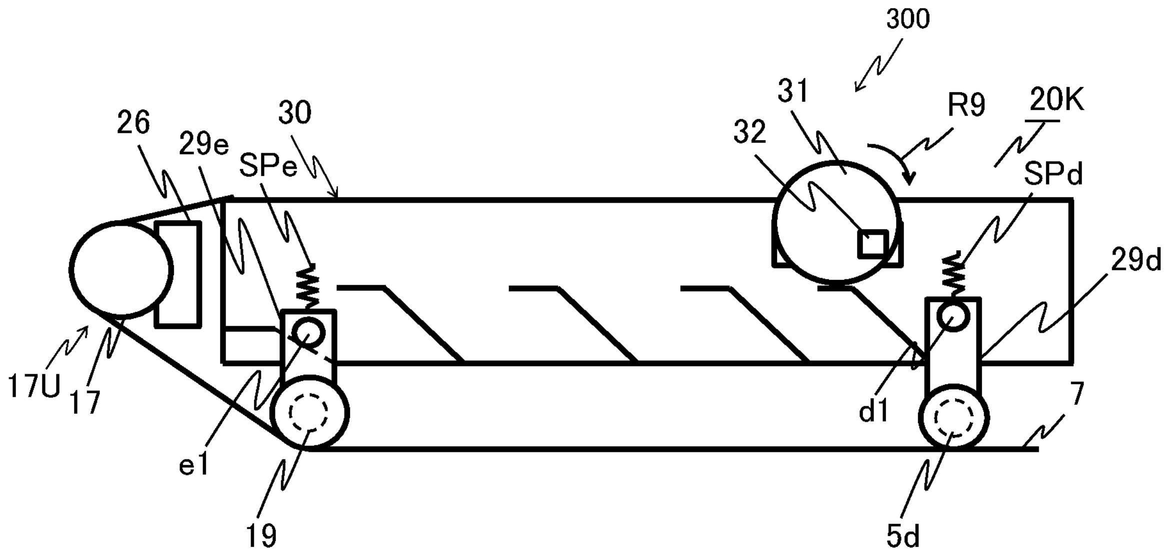
FIG. 11A is a schematic diagram illustrating a state of the separation mechanism in a monochrome mode in a monochrome intermediate transfer unit.

Specifically, the stretched cross section of the intermediate transfer belt 7 assumes the third stretched cross section illustrated in FIG. 11A in the monochrome mode, and the outer circumferential surface of the intermediate transfer belt 7 comes into contact with one photosensitive drum 1*d* in the third stretched cross section. That is, the third stretched cross section, i.e., a first stretched form, is a stretched form capable of transferring a toner image from the photosensitive drum 1*d* onto the intermediate transfer belt 7 by forming a transfer surface between the primary transfer roller 5*d* and the separation roller 19 by positioning the primary transfer roller 5*d* at the first position and the separation roller 19 at the second position. In the monochrome total separation mode, the stretched cross section of the intermediate transfer belt 7 assumes the fifth stretched cross section as illustrated in FIG. 11B, and the outer circumferential surface of the intermediate transfer belt 7 separates from one photosensitive drum 1*d* in the fifth stretched cross section. That is, the fifth stretched cross section, i.e., a second stretched form, is a stretched form for separating each one of the primary transfer roller 5*d* and the separation roller 19 from the transfer surface.

Figure 11B:
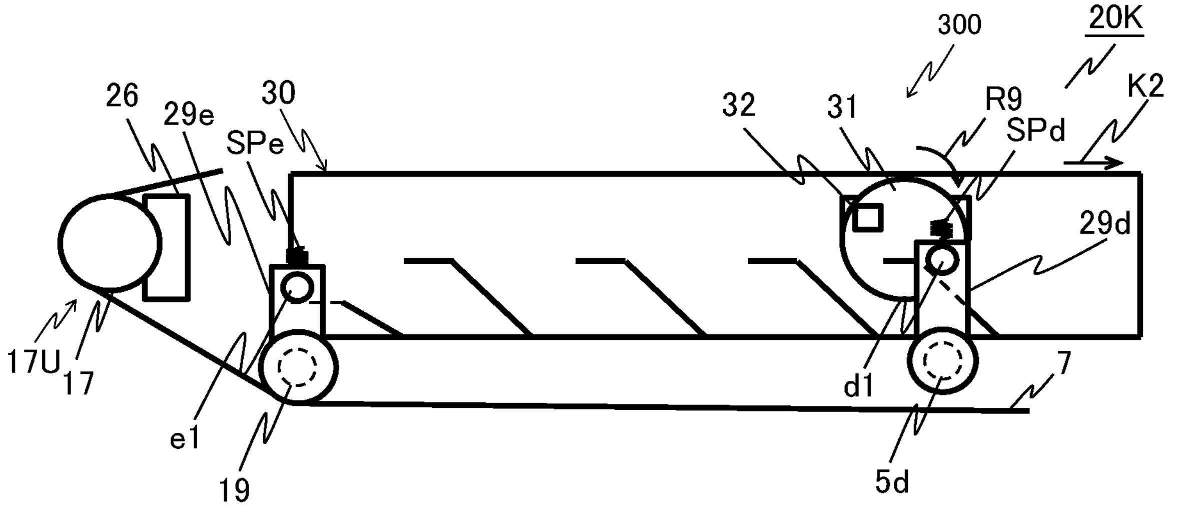
FIG. 11B is a schematic diagram illustrating a state of the separation mechanism in a total separation mode in the monochrome intermediate transfer unit.

In short, FIGS. 11A and 11B are related with the stretched cross sections as follows:

FIG. 11A: Third stretched cross section (monochrome mode)

FIG. 11B: Fifth stretched cross section (monochrome total separation mode)

Here, in a case of the present exemplary embodiment, the third stretched cross section as indicated in FIG. 11A is the same as the first stretched cross section as indicated in FIG. 8A. That is, in a case of forming a monochrome image in the monochrome image forming apparatus 200K, it is also possible to form the monochrome image in a state in which the stretched cross section of the intermediate transfer belt 7 is changed to the second stretched cross section as indicated in FIG. 8B. However, in a case of changing the stretched cross section of the intermediate transfer belt 7 to the second stretched cross section, the tension of the intermediate transfer belt 7 drops as compared to that in the case of the first stretched cross section. Therefore, image quality of the image to be transferred onto the recording material is liable to drop due to an impact caused when the recording material enters the secondary transfer portion T2. Specifically, in a case where the recording material has a large grammage of 150 $g/m^2$ or more, the impact caused when the recording material enters the secondary transfer portion T2 is large. This impact is liable to propagate through the intermediate transfer belt 7 and to vibrate the photosensitive drum 1*d*.

Then, in a case of forming an image by mounting the intermediate transfer unit 20 to the monochrome image forming apparatus 200K, the stretched cross section of the intermediate transfer belt 7 is changed to the third stretched cross section which is the same as the first stretched cross section. That is, the same stretched cross section as that in executing the full color mode or the contact monochrome mode in the full-color image forming apparatus 200 is set. In other words, the control portion 50 controls the separation mechanism 300 such that the separation roller 19 in forming an image is positioned at the second position. This arrangement makes it possible to suppress image quality of an image to be transferred to the recording material S from dropping. It is possible to suppress the image quality of the image to be transferred from dropping even if grammage of the recording material is large in particular.

The fifth stretched cross section as illustrated in FIG. 11B is the same as the fourth stretched cross section as illustrated in FIG. 8C. That is, in a case of separating the photosensitive drum 1*d* in the monochrome image forming apparatus 200K, the stretched cross section of the intermediate transfer belt 7 is changed to the stretched cross section similar to the total separation mode of the full-color image forming apparatus 200. In other words, in a case of separating the photosensitive drum 1*d* from the intermediate transfer belt 7, the control portion 50 controls the separation mechanism 300 such that the separation roller 19 is positioned at the third position. This arrangement makes it possible to commonly use the separation mechanism 300 in the full-color image forming apparatus 200 and in the monochrome image forming apparatus 200K and to cut the costs.

This arrangement will be specifically described below. As described above, the primary transfer roller 5*d* facing the photosensitive drum 1*d* of the image forming unit Pd is disposed within the inner circumferential side of the intermediate transfer belt 7 (see FIG. 2). In the present exemplary embodiment, the primary transfer roller 5*d* and the separation roller 19 located upstream of the primary transfer roller 5*d* are relatively movable with respect to the frame member of the intermediate transfer unit 20K.

The movement of the primary transfer roller 5*d* and the separation roller 19 is made by the slide motion of the separation slider 30 as illustrated in FIG. 7, which is the same as the intermediate transfer unit 20 described above. In the present exemplary embodiment, the movement of the primary transfer roller 5*d* and the separation roller 19 is thus made by the separation mechanism 300 including the separation slider 30 and the separation cam 31, and the modes as illustrated in FIGS. 11A and 11B are switched. It is noted the following mode switching operation is achieved by controlling the rotational phase of the separation cam shaft 32 based on a control signal emitted from the control portion 50 (see FIG. 2) mounted in the monochrome image forming apparatus 200K. Still further, while the following description will be made by exemplifying an operation in switching the modes in an order of the monochrome mode and the total separation mode, it is possible to switch among arbitrary modes by following the operation inversely.

In the monochrome mode as illustrated in FIG. 11A, both of the primary transfer roller 5*d* and the separation roller 19 are held at the lower stage position, i.e., the first and second positions, and the intermediate transfer belt 7 comes into contact with the photosensitive drum 1*d* (see FIG. 2) of the image forming unit Pd. In this state, a monochrome image can be formed onto the recording material by executing the image forming operation by the image forming unit Pd and by transferring the toner image formed on the photosensitive drum 1*d* to the recording material through the intermediate transfer belt 7. That is, the stretched cross section in the monochrome mode is the same as the stretched cross section of the intermediate transfer belt 7 in the full color mode as illustrated in FIG. 8A.

In a case where the mode is switched from the monochrome mode to the total separation mode illustrated in FIG. 11B, the separation cam 31 rotates by 180 degrees in the direction of the arrow R9 and the separation slider 30 slides toward the right side in FIG. 11B, i.e., in the direction of the arrow K2. That is, in a case where the mode is switched from the monochrome mode, i.e., the third stretched cross section or the first stretched form, to the monochrome total separation mode, i.e., the fifth stretched cross section or the second stretched form, the stretched cross section of the intermediate transfer belt 7 is switched to the stretched cross section corresponding to the second stretched cross section in FIG. 8B, i.e., the third stretched form, when the separation cam 31 rotates by 90 degrees in the direction of the arrow R9. The second stretched cross section, i.e., the third stretched form, is a stretched form by which the primary transfer roller 5*d* is positioned at the transfer surface and the separation roller 19 is separated from the transfer surface. Therefore, it is possible to lower a torque required for the separating operation because the mode passes through the second stretched cross section once in switching to the third and fifth stretched cross sections. That is, it is possible to suppress the torque required in the separating motion as compared to a case directly switching from the monochrome mode, i.e., the third stretched cross section, to the monochrome total separation mode, i.e., the fifth stretched cross section, without passing through the second stretched cross section. It is because the separation roller 19 and the primary transfer roller 5*d* move orderly in a case where the monochrome mode passes through the second stretched cross section in contrast to that the primary transfer roller 5*d* and the separation roller 19 are both moved in a case where the monochrome mode is directly switched to the monochrome total separation mode. That is, the separation roller 19 moves without moving the primary transfer roller 5*d* in switching from the monochrome mode to the second stretched cross section and the primary transfer roller 5*d* moves in the switching next from the stretched cross section to the monochrome total separation mode.

It is arranged so as to pass through the second stretched cross section also in switching from the monochrome total separation mode to the monochrome mode. It is possible to suppress the torque required for the switching operation as compared to the case where the mode is switched directly from the monochrome total separation mode to the monochrome mode. It is because the primary transfer roller 5*d* and the separation roller 19 are orderly moved by passing through the second stretched cross section similarly to the abovementioned reason. It is noted that while the control is made so as to always pass through the second stretched cross section in switching the monochrome total separation mode and the monochrome mode in the present exemplary embodiment, the present disclosure is not limited to such a case. For instance, the monochrome total separation mode and the monochrome mode may be switched without passing through the second stretched cross section.

Figure 9:
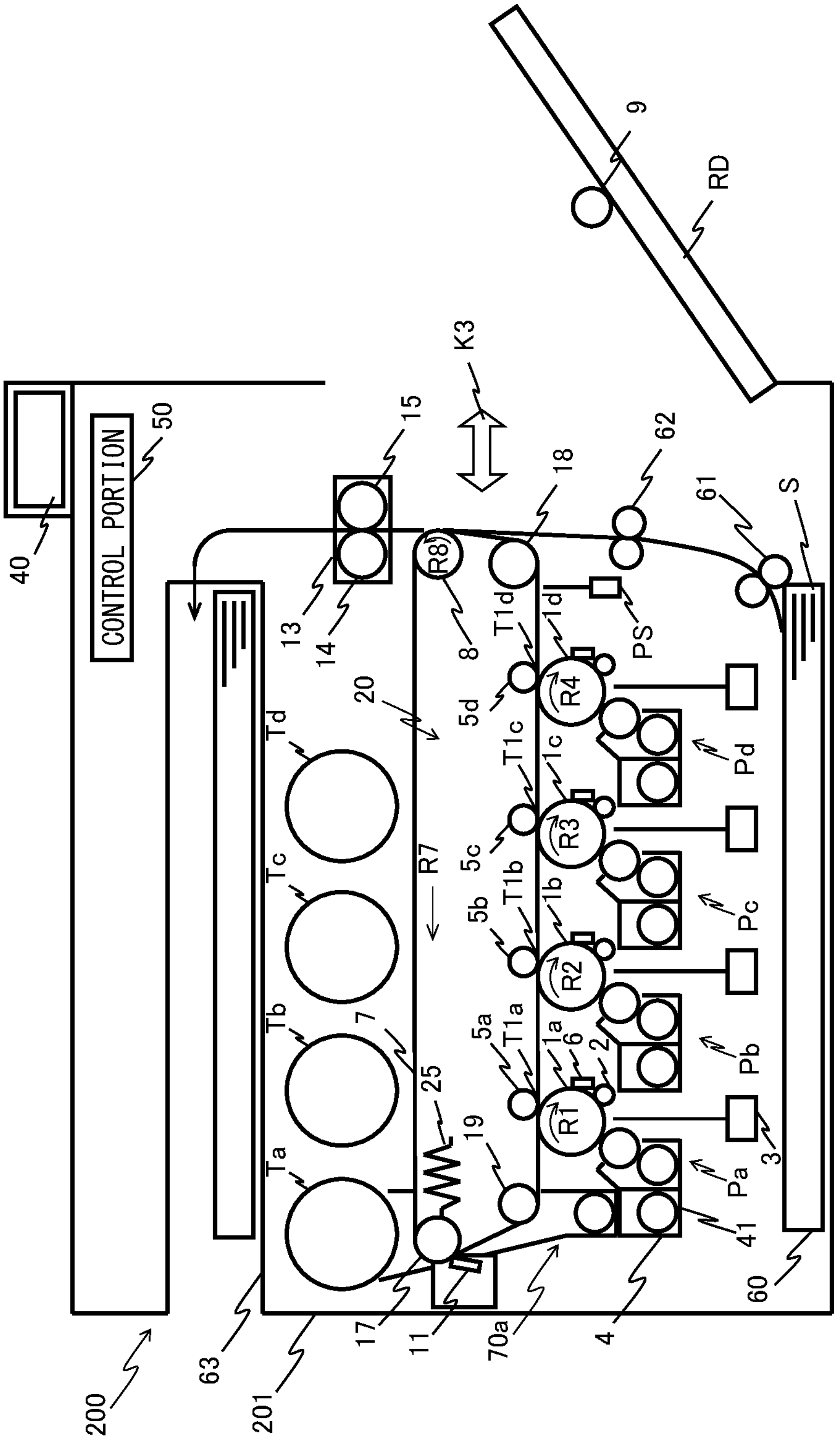
FIG. 9 is schematic section view illustrating a configuration for mounting and removing the intermediate transfer unit to/out of an apparatus body.

In the total separation mode, the primary transfer roller 5*d* moves to the upper stage position to separate from the inner circumferential surface of the intermediate transfer belt 7 and the separation roller 19 moves to the upper stage position, i.e., the third position. At this time, the intermediate transfer belt 7 is put into a state of being stretched by the separation roller 19 at the upper stage position and the upstream guide roller 18 (see FIG. 2) and separates from the photosensitive drum 1*d*. The intermediate transfer unit 20K can be mounted to and removed out of the apparatus body of the monochrome image forming apparatus 200K in the state of being held in the abovementioned total separation mode as illustrated in FIG. 9 described above. That is, the intermediate transfer unit 20K can be mounted to and removed out of the apparatus body in a state in which the stretched cross section of the intermediate transfer belt 7 is the fifth stretched cross section as illustrated in FIG. 11B.

The control portion 50 controls so as to change to the total separation mode in a case where the monochrome image forming apparatus 200K is waiting for a signal, e.g., a print job, of instructing to start an image forming operation, besides a case of undertaking replacement of the intermediate transfer unit 20K. Specifically, the user turns off the power supply in replacing the intermediate transfer unit 20K. Receiving a signal for turning off the power supply, the control portion 50 is arranged so as to turn off the power supply after changing to the total separation mode. The control portion 50 is also arranged so as to change to the total separation mode in a case where the control portion 50 detects that the right door RD is opened to replace the intermediate transfer unit 20. The control portion 50 also changes to the total separation mode to suppress the photosensitive drum and the intermediate transfer belt 7 from rubbing and being damaged from each other in taking the image forming unit, e.g., a drum cartridge, out of the apparatus body to replace the photosensitive drum. Specifically, the control portion 50 changes to the total separation mode in a case where the control portion 50 detects that a front door is opened to change the photosensitive drum. Still further, in a case where the intermediate transfer unit 20K is left for a long period of time, there is a case where a curl is left in an area of the intermediate transfer belt 7 facing and wound around the stretch roller, i.e., a curved shape of the stretch roller is temporally left on the belt. Then, the control portion 50 is arranged so as to change to the total separation mode in a case where a state in which no image is formed continues for a predetermined time.

An image forming operation in a stretched cross section corresponding to the BK mode of the intermediate transfer unit 20 as illustrated in FIG. 8B is not normally executed in the intermediate transfer unit 20K. It is because it is desirable to always keep in the monochrome mode as illustrated in FIG. 11A because it is effective to increase the tension of the belt member to the propagation of the impact as described above regarding switching of the intermediate transfer unit 20 to the CL mode corresponding to a type of a recording material. It is also because it is not necessary to worry about deterioration of the developer and the photosensitive drum along the image forming operation and also about a running cost because the image forming units Pa, Pb and Pc of yellow, magenta and cyan are removed in the monochrome image forming apparatus 200K. That is, the monochrome image forming apparatus 200K is arranged so as to form an image by the third stretched cross section in FIG. 11A regardless of the grammage of the recording material.

The separation roller 19 is one example of the roller members by which the belt member is stretched, and the lower stage position in FIG. 11A corresponds to the second position and the upper stage position in FIG. 11B corresponds to the third position in which the separation roller 19 is moved to the inner circumferential side of the belt member as compared to the second position. The separation mechanism 300 is one example of a movement mechanism for moving such roller member to the second and third positions.

Still further, the tension of the intermediate transfer belt 7 is higher in the third stretched cross section as illustrated in FIG. 11A than that of the second stretched cross section as illustrated in FIG. 8B, so that the intermediate transfer belt 7 can be driven stably. Due to that, it is preferable to execute the control based on the concentration of the patch image detected by the patch sensor PS described above in the state of the third stretched cross section. Then, according to the present exemplary embodiment, the control portion 50 executes the control using the patch sensor PS periodically or appropriately in the monochrome mode. That is, the control portion 50 executes the control using the patch sensor PS in a case where the stretched cross section of the intermediate transfer belt 7 is the third stretched cross section as illustrated in FIG. 11A or in a case where the separation roller 19 is positioned at the second position.

In the case of the present exemplary embodiment, the intermediate transfer unit 20 used in the full-color image forming apparatus 200 including the plurality of photosensitive drums 1*a* through 1*d* is in common with the intermediate transfer unit 20K used in the monochrome image forming apparatus 200K including one photosensitive drum 1*d*. Then, according to the present exemplary embodiment, it is possible to suppress the image quality of the transferred image from dropping in the monochrome image forming apparatus 200K. That is, the stretched cross section of the intermediate transfer belt 7 is switched to the third stretched cross section which is the same as the first stretched cross section in forming an image by mounting the intermediate transfer unit 20K to the monochrome image forming apparatus 200K. The first stretched cross section is a stretched cross section in a case of executing the full color mode or the contact monochrome mode in the full-color image forming apparatus 200, so that the tension of the intermediate transfer belt 7 is high. This arrangement makes it possible to suppress image quality of the image to be transferred to the recording material S from dropping. It is also possible to suppress the quality of the transferred image from dropping even if the grammage of the recording material is large in particular.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-150923, filed Sep. 9, 2020, which is hereby incorporated by reference herein in its entirety.

What is claimed is:

1. A monochrome image forming apparatus comprising:

a single photosensitive drum configured to bear a toner image;

a belt member onto which the toner image formed on the photosensitive drum is transferred;

a transfer member configured to transfer the toner image from the photosensitive drum to the belt member;

a plurality of stretch rollers stretching the belt member, the plurality of stretch rollers including a separation roller provided movably at a position upstream of the transfer member and adjacent to the transfer member with respect to a rotation direction of the belt member;

a change mechanism configured to change the positions of the transfer member and the separation roller by changing a phase of the change mechanism, the change mechanism being configured to switch the phase among a plurality of phases including first, second, and third phases, the first phase being a phase in which the transfer member is positioned at a first position and the separation roller at a second position, the second phase being a phase in which the transfer member is positioned at the first position, and the separation roller is positioned at a position away from the second position toward the opposite side of the photosensitive drum, and the third phase being a phase in which the transfer member is positioned at a position away from the first position toward the opposite side of the photosensitive drum, and the separation roller is positioned at a position away from the second position toward the opposite side of the photosensitive drum; and a control portion configured to control the change mechanism, wherein the control portion is configured to control the change mechanism such that the phase is set to the first phase when the toner image is transferred from the photosensitive drum to the belt member.

2. The monochrome image forming apparatus according to claim 1, wherein no image forming operation is executed in a case where the phase is set to the second phase.

3. The monochrome image forming apparatus according to claim 1, wherein the control portion is configured to control the change mechanism so as to change the phase to the third phase in turning off a power source of the image forming apparatus.

4. The monochrome image forming apparatus according to claim 1, wherein the control portion is configured to control the change mechanism so as to change the phase to the third phase based on an elapsed time from an end of an image forming operation.

5. The monochrome image forming apparatus according to claim 1, wherein the control portion is configured to control the change mechanism such that the phase is switched from the third phase to the first phase via the second phase.

6. The monochrome image forming apparatus according to claim 1, wherein the control portion is configured to control the change mechanism such that the phase is switched from the first phase to the third phase without passing through the second phase.

7. The monochrome image forming apparatus according to claim 1, wherein the change mechanism includes a slide member provided to be movable and including a first cam surface for moving the transfer member and a second cam surface for moving the separation roller, and a rotational cam provided so as to be in contact with the slide member and to move the slide member, and wherein the control portion controls a phase of the rotational cam.

8. The monochrome image forming apparatus according to claim 1, wherein the control portion is configured to control the change mechanism such that the phase is set to the first phase when the toner image is transferred from the belt member to a recording material regardless of the grammage of the recording material on which the toner image is to be transferred.

9. The monochrome image forming apparatus according to claim 1, wherein the separation roller is configured to come into contact with the belt member in a case where the phase is set to the second phase.

10. A monochrome image forming apparatus comprising:

a single photosensitive drum configured to bear a toner image;

a belt member onto which the toner image formed on the photosensitive drum is transferred;

a transfer member configured to transfer the toner image from the photosensitive drum to the belt member;

a plurality of stretch rollers stretching the belt member, the plurality of stretch rollers including a separation roller provided movably at a position upstream of the transfer member and adjacent to the transfer member with respect to a rotation direction of the belt member;

a change mechanism configured to change the positions of the transfer member and the separation roller by changing a phase of the change mechanism, the change mechanism being configured to switch the phase among a plurality of phases including first and second phases, the first phase being a phase in which the transfer member is positioned at a first position and the separation roller at a second position, and the second phase being a phase in which the transfer member is positioned at the first position, and the separation roller is positioned at a position away from the second position toward the opposite side of the photosensitive drum; and a control portion configured to control the change mechanism, wherein the control portion is configured to control the change mechanism such that the phase is set to the first phase when the toner image is transferred from the drum to the belt, and wherein no image forming operation is executed in a case where the phase is set to the second phase.

11. The monochrome image forming apparatus according to claim 10, wherein the separation roller is configured to come into contact with the belt member in a case where the phase is set to the second phase.

* * * * *